(12) United States Patent
Tanaka

(10) Patent No.: US 9,167,598 B2
(45) Date of Patent: Oct. 20, 2015

(54) BASE STATION APPARATUS, MOBILE STATION APPARATUS, RADIO COMMUNICATION METHOD, AND RADIO COMMUNICATION SYSTEM

(71) Applicant: FUJITSU LIMITED, Kawasaki-shi, Kanagawa (JP)

(72) Inventor: Yoshinori Tanaka, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 210 days.

(21) Appl. No.: 13/938,814

(22) Filed: Jul. 10, 2013

(65) Prior Publication Data

US 2013/0294387 A1     Nov. 7, 2013

Related U.S. Application Data

(63) Continuation of application No. PCT/JP2011/051565, filed on Jan. 27, 2011.

(51) Int. Cl.
| | | |
|---|---|---|
| *H04L 1/00* | (2006.01) | |
| *H04W 72/12* | (2009.01) | |
| *H04W 56/00* | (2009.01) | |

(52) U.S. Cl.
CPC ...... *H04W 72/1289* (2013.01); *H04W 56/0045* (2013.01)

(58) Field of Classification Search
CPC ..... H04W 80/04; H04W 80/05; H04W 80/06; H04W 80/07; H04W 80/08; H04W 72/04; H04W 72/05; H04W 72/06; H04M 3/561; H04M 3/562; H04M 3/563; H04M 3/564
USPC .................. 370/229, 230, 259, 260, 328, 329
See application file for complete search history.

(56) References Cited

U.S. PATENT DOCUMENTS

| | | |
|---|---|---|
| 5,546,383 A | 8/1996 | Cooley et al. |
| 2002/0173327 A1 | 11/2002 | Rosen et al. |
| 2009/0262699 A1 | 10/2009 | Wengerter et al. |
| 2011/0244788 A1 | 10/2011 | Ode et al. |
| 2013/0136072 A1* | 5/2013 | Bachmann et al. ........... 370/329 |

FOREIGN PATENT DOCUMENTS

| | | |
|---|---|---|
| JP | 2004-112135 | 4/2004 |
| JP | 2007-43752 | 2/2007 |
| JP | 2009-537083 | 10/2009 |
| JP | 2010-45796 A | 2/2010 |
| JP | 2012-524429 A | 10/2012 |

(Continued)

OTHER PUBLICATIONS

International search report issued for corresponding International Patent Application No. PCT/JP2011/051565, mailed Feb. 22, 2011.

(Continued)

*Primary Examiner* — Dady Chery

(74) *Attorney, Agent, or Firm* — Myers Wolin, LLC

(57) ABSTRACT

A base station apparatus for performing radio communication with a mobile station apparatus, the base station apparatus includes: a group generation unit which groups a plurality of mobile station apparatuses controllable with a same control amount of transmission timing; and a transmission unit which transmits the control amount of transmission timing to the grouped plurality of mobile station apparatuses.

19 Claims, 23 Drawing Sheets

RADIO COMMUNICATION SYSTEM 10

(56) References Cited

FOREIGN PATENT DOCUMENTS

| WO | 01/11907 | 2/2001 |
| WO | 20101073403 A1 | 7/2010 |
| WO | 2010/121372 A1 | 10/2010 |

OTHER PUBLICATIONS

3GPP TR 36.913 V9.0.0; 3rd Generation Partnership Project; Technical Specification Group Radio Access Network; "Requirements for further advancements for Evolved Universal Terrestrial Radio Access (E-UTRA) (LTE-Advanced) (Release 9)"; Dec. 2009.

3GPP TS 36.211 V9.1.0; 3rd Generation Partnership Project; Technical Specification Group Radio Access Network; Evolved Universal Terrestrial Radio Access (E-UTRA); "Physical Channels and Modulation (Release 9)"; Mar. 2010.

3GPP TS 36.212 V9.1.0; 3rd Generation Partnership Project; Technical Specification Group Radio Access Network; Evolved Universal Terrestrial Radio Access (E-UTRA); "Multiplexing and channel coding (Release 9)"; Mar. 2010.

3GPP TS 36.213 V9.1.0; 3rd Generation Partnership Project; Technical Specification Group Radio Access Network; Evolved Universal Terrestrial Radio Access (E-UTRA); "Physical layer procedures (Release 9)"; Mar. 2010.

3GPP TR 36.814 V9.0.0; 3rd Generation Partnership Project; Technical Specification Group Radio Access Network; Evolved Universal Terrestrial Radio Access (E-UTRA); "Further advancements for E-UTRA physical layer aspects (Release 9)"; Mar. 2010.

QUALCOMM Europe, "Multi-user Timing control", Agenda Item 6.10, Feb. 12-16, 2007, 3GPP TSG-RAN WG1 #48, R1-070664, St. Louis, USA.

Notification of Reason for Rejection issued for corresponding Japanese Patent Application No. 2012-554581, mailed on Jul. 29, 2014 with an English translation.

\* cited by examiner

BASE STATION APPARATUS, MOBILE STATION APPARATUS, RADIO COMMUNICATION METHOD, AND RADIO COMMUNICATION SYSTEM

CROSS-REFERENCE TO RELATED APPLICATION

This application is a continuation application of International Application PCT/JP2011/051565, filed on Jan. 27, 2011 and designated the U.S., the entire contents of which are incorporated herein by reference.

FIELD

The embodiments discussed herein are related to a base station apparatus, a mobile station apparatus, a radio communication method, and a radio communication system.

BACKGROUND

These days, a radio communication system, such as portable telephone system and radio LAN (Local Area Network), is widely used. In the field of radio communication, continuous discussions as to next-generation communication technologies is made in order to further improve communication speed and communication capacity. As the next-generation communication technology, for example, standardization regarding LTE and LTE-Advanced is completed or is under consideration.

With regards to LTE and LTE-Advanced, OFDM (Orthogonal Frequency Division Multiplexing; orthogonal frequency division multiplexing) scheme is adopted as a modulation scheme of downlink communication from a base station apparatus to a mobile station apparatus. The OFDM scheme, for example, is a communication scheme in which a frequency bandwidth is divided into a plurality of bandwidths or subcarriers, and information data is mapped on respective frequency bandwidth orthogonal to each other.

In contrast, SC-FDMA (Single Carrier-Frequency Division Multiple Access: single carrier-frequency division multiple access) scheme is adopted as a modulation scheme of uplink communication from the mobile station apparatus to the base station apparatus. The SC-FDMA, for example, is a communication scheme in which a frequency bandwidth is divided, and data is transmitted with the use of a different frequency bandwidth between a plurality of mobile station apparatuses. The SC-FDMA scheme is a single carrier transmission, compared with the OFDM scheme, so that PAPR (Peak to Averaged Power Ratio: peak to average power ratio) can be reduced. Accordingly, the SC-FDMA scheme can reduce the power consumption of an amplifier and reduce the whole power consumption of the mobile station apparatus, compared with OFDM scheme.

In the SC-OFDM scheme, for example, waveform equalization processing is performed in the base station apparatus on the reception side, so that propagation distortion in a radio channel can be suppressed. Then, the mobile station apparatus periodically inserts CP (Cyclic Prefix) into a transmission signal, which makes it possible to perform the waveform equalization processing in a frequency domain in the base station apparatus. An arithmetic processing amount in the frequency domain in the base station apparatus can be reduced by the insertion of CP, compared with an arithmetic processing amount in a time domain. However, for example, when a timing difference between reception signals is larger than a CP length, orthogonality between the reception signals is not maintained, and interference between the signals occurs, and reception quality deteriorates, compared with a case where the timing difference between the reception signals falls within the CP length. Accordingly, in the base station apparatus, transmission timing control is performed with respect to each mobile station apparatus, in order to prevent a timing discrepancy between the reception signals.

FIG. 23 is a flowchart illustrating the example of operation of the transmission timing control. A mobile station apparatus UE (User Equipment) transmits a data signal or a pilot signal (Sounding Reference Signal: SRS) to a base station apparatus eNB (evolved Node B) (S110). The base station apparatus eNB measures a timing difference between a transmission frame and a reception frame regarding the data signal (S111), obtains a timing correction amount $N_{TA}$ based on a measured value, and feeds back the timing correction amount $N_{TA}$ as a control signal (S112).

FIG. 24 is a diagram illustrating an example of a difference between a frame timing (downlink transmission timing) of the base station apparatus eNB and a frame timing (uplink transmission timing) of the mobile station apparatus UE. The mobile station apparatus UE which receives the control signal from the base station apparatus eNB transmits the data signal earlier by a time interval obtained by adding a fixed value $N_{TAoffset}$ to the timing correction amount $N_{TA}$ and multiplying a fixed value Ts than the frame timing that the mobile station apparatus UE grasps. Accordingly, the base station apparatus eNB can receive the data signal transmitted from the mobile station apparatus UE at a timing in synchronism with the frame timing.

Non-Patent Document 1: 3GPPTS 36. 211 V9. 1. 0
Non-Patent Document 2: 3GPPTS 36. 212 V9. 1. 0
Non-Patent Document 3: 3GPPTS 36. 213 V9. 1. 0
Non-Patent Document 4: 3GPPTR 36. 913
Non-Patent Document 5: 3GPPTR 36. 814

However, a plurality of mobile station apparatuses UE include a different discrepancy in uplink transmission timing, so that the uplink transmission timing control described above is performed for each mobile station apparatus UE. Accordingly, when the base station apparatus eNB connects to a plurality of mobile station apparatuses UE and performs the transmission timing control in a cell, the base station apparatus eNB feeds back the control signal including the timing correction amount $N_{TA}$ to the plurality of mobile station apparatuses UE. For this reason, the transmission amount of the control signals transmitted from the base station apparatus eNB is increased corresponding to an increase in the number of mobile station apparatuses UE, and accordingly, overhead regarding the transmission of the control signals is increased.

FIG. 25 is a diagram illustrating an example of the transmission timing control with respect to the plurality of mobile station apparatuses UE in a running train. In this case, the base station apparatus eNB performs the transmission timing control with respect to the respective plurality of mobile station apparatuses UE in accordance with the movement of the train. Similarly, the base station apparatus eNB feeds back the control signals corresponding to the number of the plurality of mobile station apparatuses UE and performs the transmission timing control. Accordingly, the overhead of the control signal transmitted from the base station apparatus eNB is increased corresponding to an increase in the number of mobile station apparatuses UE.

SUMMARY

According to an aspect of the embodiments, a base station apparatus for performing radio communication with a mobile station apparatus, the base station apparatus includes: a group generation unit which groups a plurality of mobile station apparatuses controllable with a same control amount of transmission timing; and a transmission unit which transmits the control amount of transmission timing to the grouped plurality of mobile station apparatuses.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
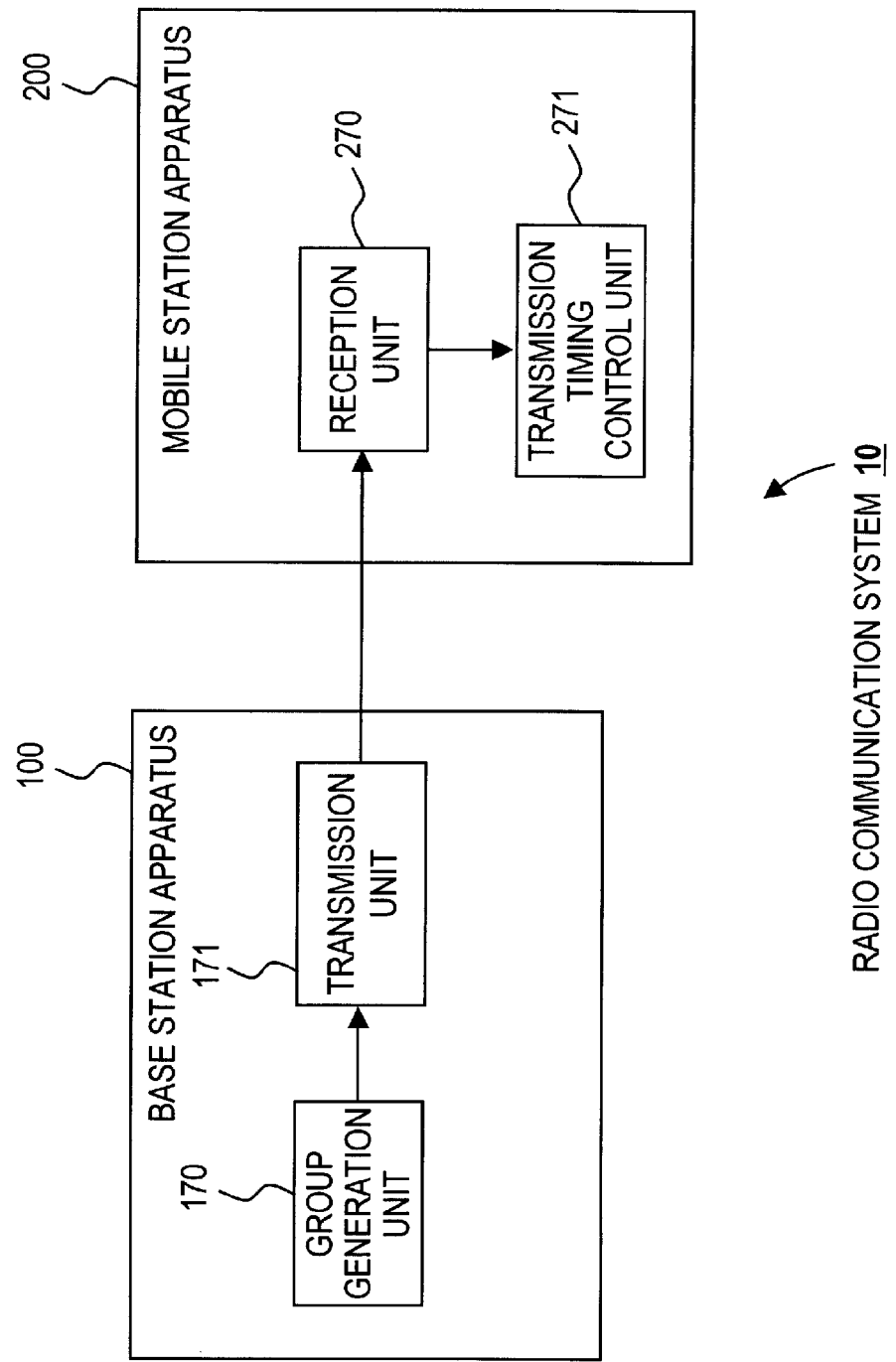
FIG. 1 is a diagram illustrating the example of the configuration of a radio communication system.

Hereinafter, the embodiments of the present invention will be described in detail referring to the drawings.

First Embodiment

FIG. 1 is a diagram illustrating an example of a configuration of a radio communication system of the first embodiment of the present invention. A radio communication system 10 includes a base station apparatus 100 and a mobile station apparatus 200, and radio communication is performed between the base station apparatus 100 and the mobile station apparatus 200. The example of FIG. 1 illustrates one unit of mobile station apparatus 200, but a plurality of mobile station apparatuses 200 may be provided.

The base station apparatus 100 includes a group generation unit 170 and a transmission unit 171. The group generation unit 170 groups a plurality of controllable mobile station apparatuses 200 controllable with a same control amount of transmission timing. The transmission unit 171 transmits the control amount of transmission timing to the grouped plurality of mobile station apparatuses 200.

On the other hand, the mobile station apparatus 200 includes a reception unit 270 and a transmission timing control unit 271. The reception unit 270 receives the control amount of transmission timing transmitted from the base station apparatus 100. The transmission timing control unit 271 controls the transmission timing of a radio signal transmitting to the base station apparatus, in accordance with the received control amount of transmission timing.

The base station apparatus 100 transmits the control amount of transmission timing to the grouped plurality of mobile station apparatuses 200, so that the overhead of the control signal can be reduced, compared with the case where the control signals are separately transmitted to the respective plurality of mobile station apparatuses 200. Also, the mobile station apparatus 200 is one of the grouped plurality of mobile station apparatuses in the base station apparatus 100, and can control the transmission timing of the radio signal transmitting to the base station apparatus 100 in accordance with the control amount of transmission timing. Accordingly, the reception timing is controlled by the radio signal transmitted from the mobile station apparatus 200 in the base station apparatus 100, so that a discrepancy in the reception timing in the base station apparatus 100 can be prevented.

Second Embodiment

Example of Entire Configuration

Figure 2:
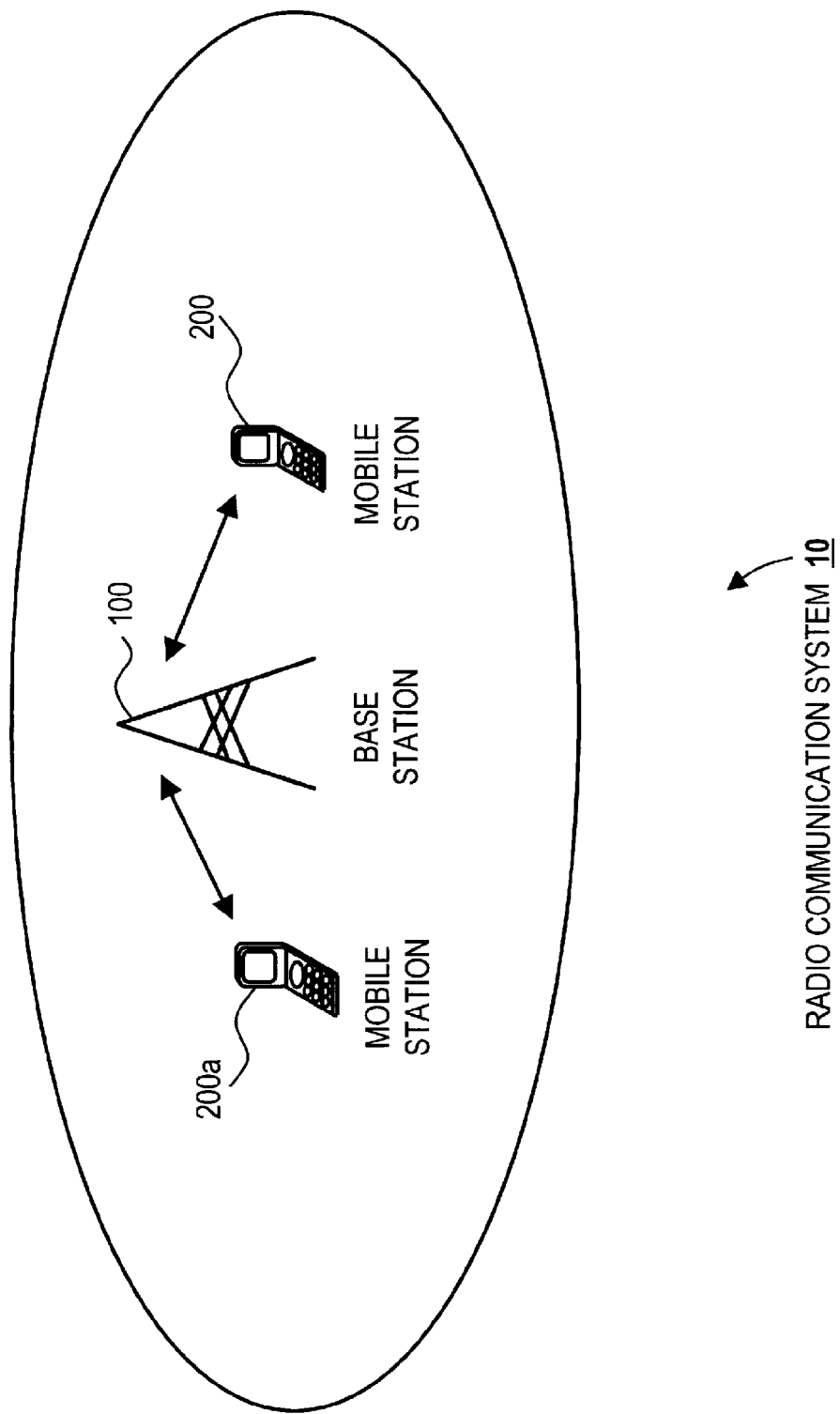
FIG. 2 is a diagram illustrating the example of the configuration of the radio communication system.

FIG. 2 is a diagram illustrating an example of a configuration of a radio communication system 10 of the second embodiment of the present invention. The radio communication system 10 includes a radio base station apparatus (hereinafter, referred to as "base station") 100 and mobile station apparatuses (hereinafter, referred to as "mobile station") 200 and 200a.

The base station 100 is a radio communication apparatus which wirelessly connects to the mobile stations 200 and 200a and performs radio communication. Also, the base station 100 can provide various services such as voice communication and video delivery within one or plural cells range with respect to the mobile stations 200 and 200a. Further, the base station 100 can control transmission timing of the mobile stations 200 and 200a, and the details are described later.

The mobile stations 200 and 200a are radio communication apparatuses which are wirelessly connected to the base station 100 and perform radio communication, and which are exemplified by mobile phones, information portable terminal apparatuses, and the like. The mobile stations 200 and 200a receive data signals and the like from the base station 100 and transmits the data signals and the like to the base station 100. In the description, a communication link from the base station 100 to the mobile stations 200 and 200a is referred to as a down communication link (DL: Down Link), and the communication link from the mobile stations 200 and 200a to the base station 100 is referred to as an up communication link (UL: Up Link).

Considering the example of FIG. 2, two mobile stations 200 and 200a are illustrated, but the example may be replaced with an example where three mobile stations or more are illustrated, or where one mobile station is illustrated. The mobile stations 200 and 200a both are of the same configuration, and unless stipulated otherwise, the mobile station 200 is described as an example.

<Example of Configurations of Base Station 100 and Mobile Station 200>

Figure 3:
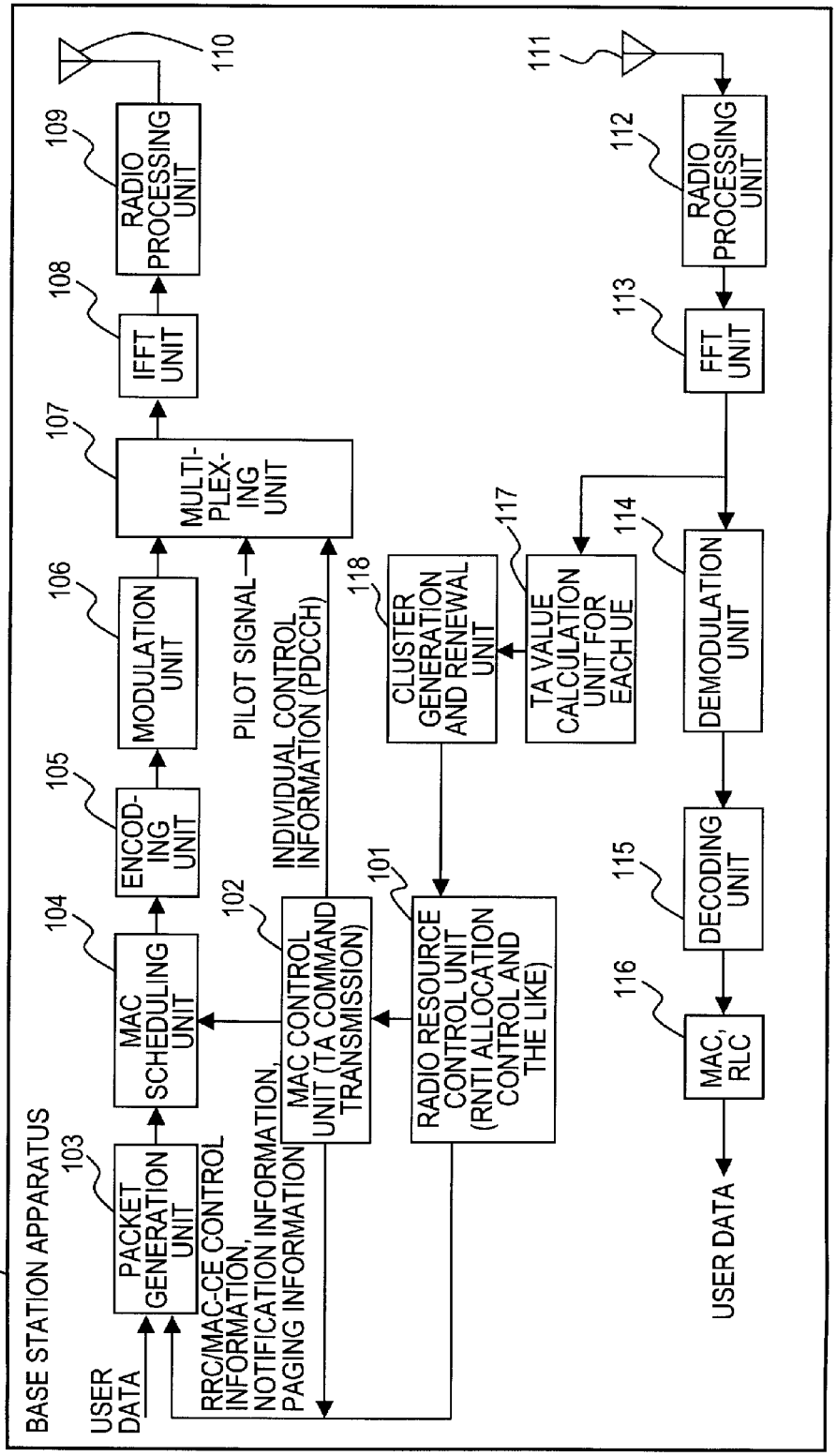
FIG. 3 is a diagram illustrating the example of the configuration of a base station apparatus.
Figure 4:
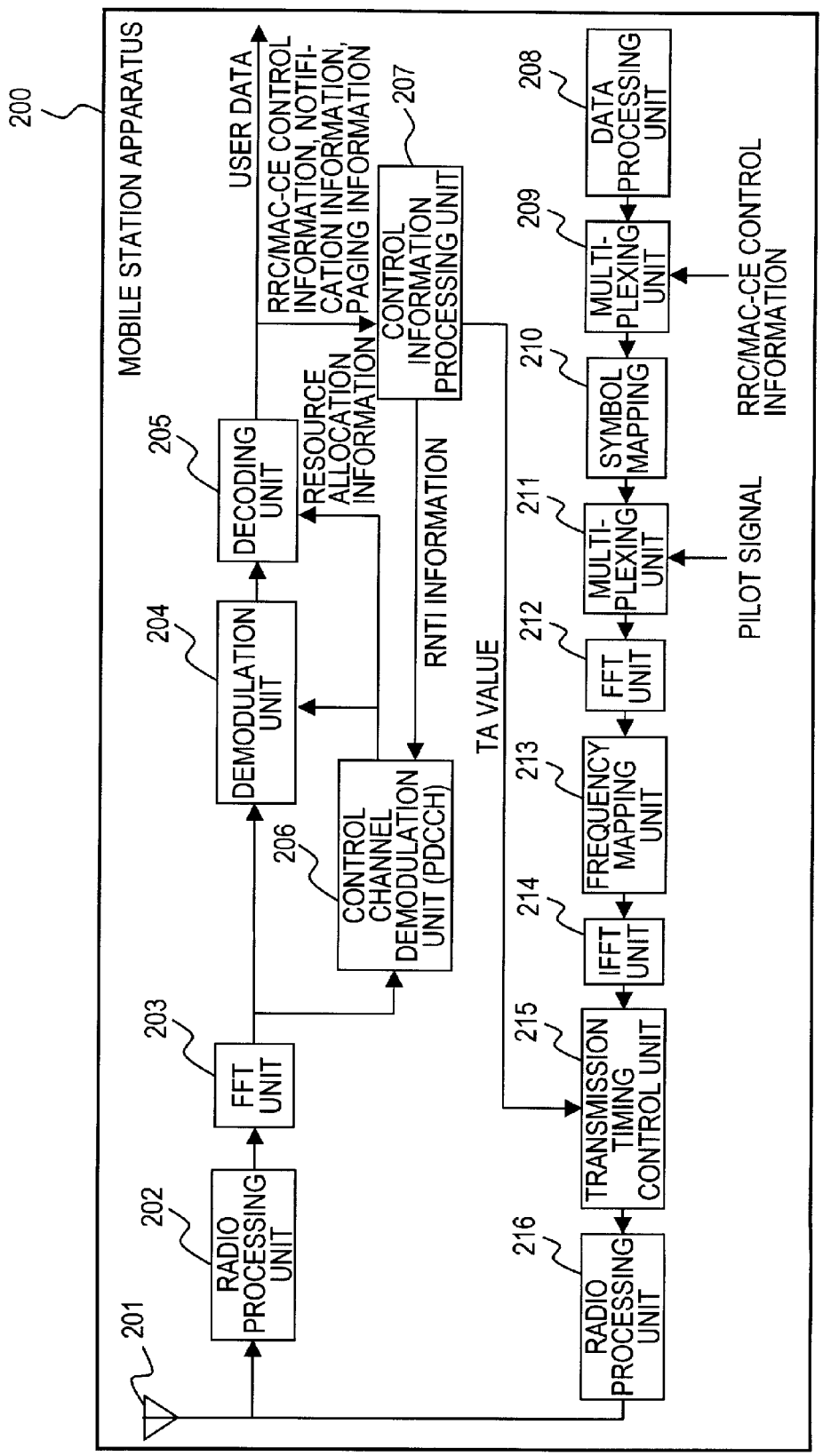
FIG. 4 is a diagram illustrating the example of the configuration of a mobile station apparatus.

Next, the example of each configuration of the base station 100 and the mobile station 200 will be described. FIG. 3 is a diagram illustrating the example of the configuration of the base station 100, and FIG. 4 is a diagram illustrating the example of the configuration of the mobile station 200.

The base station 100 includes a radio resource control unit 101, a MAC (Multimedia Access Control) control unit 102, a packet generation unit 103, a MAC scheduling unit 104, a encoding unit 105, a modulation unit 106, a multiplexing unit 107, an IFFT unit (Inverse Fourier Transformer Transform) 108, a radio processing unit 109, and a transmission antenna 110. Similarly, the base station 100 includes a reception antenna 111, a radio processing unit 112, an FFT unit 113, a demodulation unit 114, a decoding unit 115, a RLC unit 116, a TA value calculation unit for each UE (hereinafter referred to as "TA value calculating unit") 117, and a cluster generation and renewal unit (hereinafter referred to as "cluster generation unit") 118.

The group generation unit 170 of the first embodiment of the present invention corresponds to the TA value calculation unit 117, and the cluster generation unit 118, for example, and the transmission unit 171 corresponds to the radio resource control unit 101 and the transmission antenna 110, for example.

The radio resource control unit 101 allocates a radio resource (for example, frequency and time) with respect to the downlink communication or the uplink communication of the mobile station 200. Also, the radio resource control unit 101 allocates various types of RNTI such as TA-RNTI (Timing Advance-Radio Network Temporary ID) based on information regarding a cluster outputted from the cluster generation unit 118. The TA-RNTI, for example, is RNIT for transmission timing control allocated to a plurality of mobile stations 200 belonging to the same cluster. A detail of the TA-RNTI is described later. The radio resource control unit 101 outputs resource allocation information or the like regarding the radio resources to be allocated, to the MAC control unit 102. Also, the radio resource control unit 101, for example, outputs the generated TA-RNTI, to the packet generation unit 103 as RRC control information. In this case, the TA-RNTI is transmitted to the mobile station 200 by using a PDSCH (Physical Downlink Shared Channel) channel. Further, the radio resource control unit 101 can generate broadcast information or paging information and output the information to the packet generation unit 103. The broadcast information and paging information is described in fourth and fifth embodiments.

The MAC control unit 102 generates individual control information based on the resource allocation information outputted from the radio resource control unit 101 and outputs to the multiplexing unit 107. The individual control information is transmitted to the mobile station 200 as the control signal, for example, by using a control channel such as a PDCCH (Physical Downlink Control Channel) channel. Also, there is a case where the MAC control unit 102 receives TA-RNTI outputted from the radio resource control unit 101, and in this case, the MAC control unit 102 can output to the multiplexing unit 107 the TA-RNTI as the individual control information. Further, the MAC control unit 102 can receive the information regarding cluster generated by the cluster generation unit 118 via the radio resource control unit 101, and in this case, the MAC control unit 102 can generate a cluster TA value and generate a TA command. The cluster TA value, for example, is a TA value which is provided for the plurality of mobile stations 200 belonging to the same cluster. The details of the cluster TA value are described later. The radio resource control unit 101 outputs the cluster TA value to the packet generation unit 103.

The packet generation unit 103 inputs user data, various control information, the cluster TA value, or the like and generates a transmission packet. The transmission packets include the user data and so one, and are transmitted by using the PDSCH channel, for example. The packet generation unit 103 outputs the generated packet to the MAC scheduling unit 104.

The MAC scheduling unit 104 performs scheduling the user data or the like based on the resource allocation information outputted from the MAC control unit 102. For example, the MAC scheduling unit 104 performs the scheduling in such a manner as to allocate the user data on the radio resource of shared channel such as the PDSCH and a PUSCH. The MAC scheduling unit 104 outputs the scheduled transmission packet to the encoding unit 105.

The encoding unit 105 performs error correction encoding to the user data, the control information, or the like in the packet. A coding scheme and coding rate of the error correction encoding are included in the resource allocation information generated by the radio resource control unit 101. For example, the encoding unit 105 receives the corresponding information from the radio resource control unit 101, and can perform the error correction encoding. The encoding unit 105 outputs to the modulation unit 106 the packet to which the error correction coding is applied.

The modulation unit 106 performs modulation processing such as QPSK (Quadrature Phase Sift Keying), 16 QAM (Quadrature A), or the like to the user data and each of control information in the error correction encoded packet. The modulation scheme is also included in the resource allocation information, and the modulation unit 106 receives the resource allocation information from the radio resource control unit 101, and can perform the modulation processing. The modulation unit 106 outputs the modulated packet to the multiplexing unit 107.

The multiplexing unit 107 multiplexes the output from the modulation unit 106, the pilot signal, and the individual control information, and outputs a multiplexed signal to the IFFT unit 108. For example, a known preamble patter in the base station 100 and the mobile station 200 is applied to the pilot signal.

The IFFT unit 108 performs Inverse Fast Fourier Transform processing for the multiplexed signal, converts the multiplexed signal in the frequency domain to a multiplexed signal in the time domain, and outputs the multiplexed signal in the time domain to the radio processing unit 109.

The radio processing unit 109 converts the multiplexed signal of base band to the radio signal of a radio band and outputs the radio signal. Accordingly, the radio processing unit 109, for example, includes various processing units such as a digital to analog converting unit, a frequency converting unit, or the like.

The transmission antenna 110 transmits the radio signal outputted from the radio processing unit 109 to the mobile station 200. Accordingly, the user data and the individual control information are transmitted to the mobile station 200 as the data signal and the control signal respectively.

In contrast, the reception antenna 111 receives the radio signal transmitted from the mobile station 200.

The radio processing unit 112 converts the radio signal of the radio band received by the reception antenna 111, to reception signal of the base band. Accordingly, the radio processing unit 112, for example, includes various processing units such as the digital to analog converting unit, the frequency converting unit, and the like.

The FFT unit 113 performs Fast Fourier Transform for the reception signal outputted from the radio processing unit 112, and converts the reception signal in the time domain to the reception signal in the frequency domain. The FFT unit 113 outputs the reception signal after the Fast Fourier Transform, to the demodulation unit 114 and the TA value calculation unit 117.

The demodulation unit 114 performs demodulation processing for the reception signal. The demodulation scheme corresponds to a modulation scheme to the radio signal transmitted by the mobile station 200, and for example, follows the resource allocation information by the radio resource control unit 101. For example, the demodulation unit 114 receives the resource allocation information from the radio resource control unit 101, and performs the demodulation in accordance with the resource allocation information.

The decoding unit 115 performs error correction decoding for the demodulated reception signal. The decoding scheme and coding rate of the error correction decoding, for example, follow the resource allocation information received from the radio resource control unit 101.

The RLC unit 116 extracts the user data and the like from the decoded reception signal. The user data to be extracted is outputted to other processing unit, for example, transmitted to an upper control apparatus.

The TA value calculation unit 117 extracts the pilot signal (Sounding reference signal) or the data signal, which is transmitted from the mobile station 200, from the reception signal outputted from the FFT unit 113, and calculates TA (Timing Advance) value for the mobile station 200 based on the pilot signal or the like. The TA value is a value represented by a difference between the frame timing of the transmission frame and the frame timing of the received radio frame, in the base station 100. The TA value calculation unit 117 measures the TA value of the mobile station 200 by calculating a difference between the uplink radio frame timing received form the mobile station 200 and the transmission frame timing of the base station 100. In a case where there is a plurality of mobile stations 200, the TA value calculation unit 117 measures a plurality of TA values. For example, the TA value calculation unit 117 outputs to the cluster generation unit 118 the calculated TA value as a timing correction amount $N_{TA}$.

The cluster generation unit 118 receives the plurality of TA values, groups the mobile stations 200 whose TA value falls within a constant range, and generates a cluster.

Figure 5:
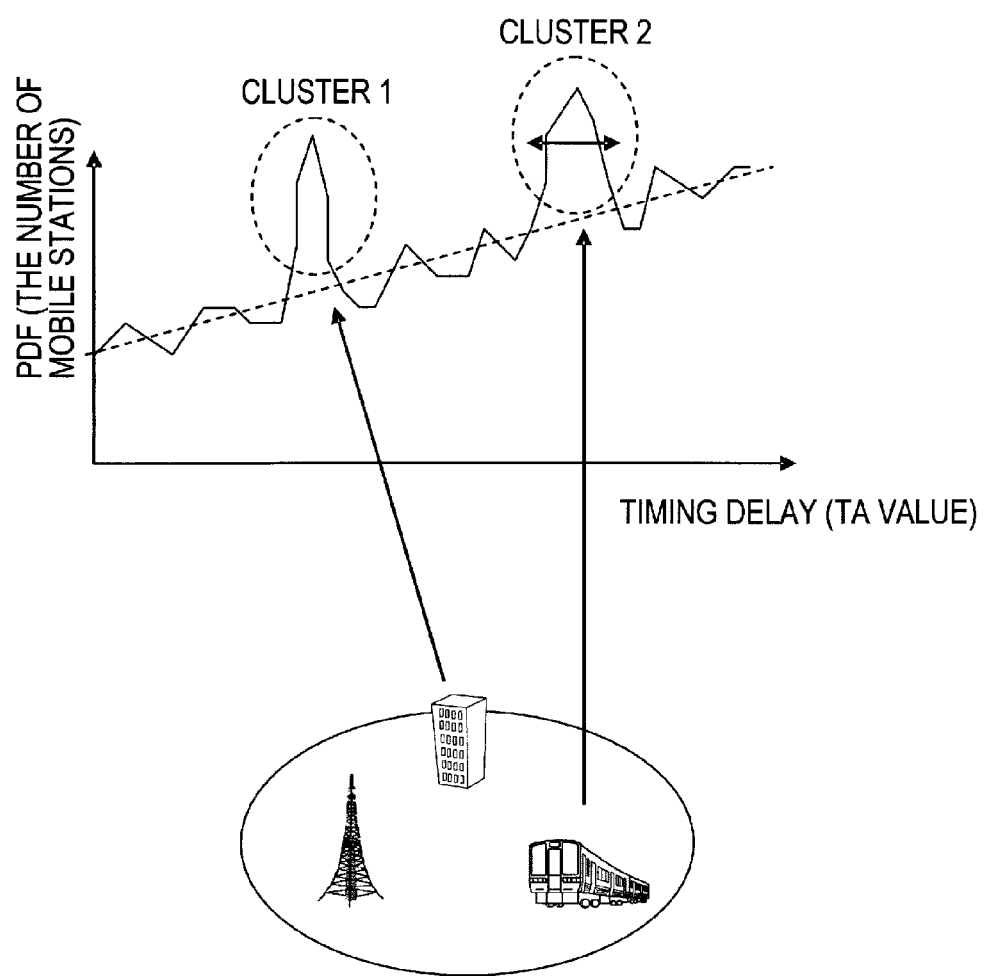
FIG. 5 is a graph illustrating the example of distribution of TA values.

FIG. 5 is a graph illustrating a distribution example of the TA value, and a vertical axis represents the number of mobile stations, and a horizontal axis represents the TA value. As is illustrated in FIG. 5, the number of mobile stations 200 is increased higher than usual at a certain point in terms of the TA values. For example, when there is the plurality of mobile stations 200 in the train, an error amount of the frame timing of each mobile station 200 falls within the constant range, therefore, for example, the distribution as illustrated in FIG. 5 is provided. The cluster generation unit 118, for example, groups the mobile stations 200 whose TA value falls within the constant range as one cluster. Or, the cluster generation unit 118, for example, groups the plurality of mobile stations 200 which are controllable by a same control amount of transmission timing, as the cluster. In the example of FIG. 5, the cluster generation unit 118 generates "cluster 1" and "cluster 2". For example, when the cluster generation unit 118 groups and generates the cluster, the cluster generation unit 118 can store in an internal memory or output to the MAC control unit 102 via the radio resource control unit 101, identification information of the cluster and identification information of the mobile station 200 belonging to the cluster, as the information regarding cluster. It is noted that, for example, there is a case where the identification information of the mobile stations 200 is included in the reception signal received from the mobile station 200, or a case where the identification information of the mobile station 200 is provided based on identification information such as the RNTI allocated by the radio resource control unit 101.

Next, the mobile station 200 will be described. As is illustrated in FIG. 4, the mobile station 200 includes an antenna 201, a radio processing unit 202, an FFT unit 203, a demodulation unit 204, a decoding unit 205, a control channel demodulation unit 206, and a control information processing unit 207. Further, the mobile station 200 includes a data processing unit 208, a multiplexing unit 209, a symbol mapping unit 210, a multiplexing unit 211, an FFT unit 212, a frequency mapping unit 213, an IFFT unit 214, a transmission timing control unit 215, and a radio processing unit 216.

The reception unit 270 according to the first embodiment of the present invention, for example, corresponds to the antenna 201 up to the control information processing unit 207, and the transmission timing control unit 271, for example, corresponds to the transmission timing control unit 215.

The antenna 201 receives the radio signal transmitted from the base station 100 and outputs to the radio processing unit 202. Also, the antenna 201 can transmit the radio signal outputted from the radio processing unit 216 to the base station 100.

The radio processing unit 202 converts the radio signal received by the antenna 201 to the reception signal of base band and output. Accordingly, the radio processing unit 202 includes various processing units such as the digital to analog converting unit, the frequency converting unit, or the like.

The FFT unit 203 converts the reception signal in the time domain to the reception signal in the frequency domain by performing the Fast Fourier Transform for the reception signal outputted from the radio processing unit 202.

The demodulation unit 204 performs the demodulation processing for the reception signal outputted from the FFT unit 203. The scheme of the demodulation processing, for example, is included in the resource allocation information received by using the PDCCH or the like, and accordingly the demodulation unit 204 performs the demodulation processing in accordance with the resource allocation information outputted from the control channel demodulation unit 206.

The decoding unit 205 performs the error correction decoding for the demodulated reception signal. The decoding scheme and decoding rate in a case where the error correction decoding is performed follow the resource allocation information outputted from the control channel demodulation unit 206. The decoding unit 205 can decode the user data prior to the error correction encoding, various control information such as RRC control information or the like, or the like, by the error correction decoding.

The control channel demodulation unit 206 demodulates the control signal transmitted by using the control channel such as the PDCCH or the like. The demodulated control information, for example, includes the resource allocation information, and the control channel demodulation unit 206 outputs the resource allocation information to the demodulation unit 204 and the decoding unit 205. Also, the control channel demodulation unit 206 determines whether or not the TA-RNTI outputted from the control information processing unit 207 matches the TA-RNTI transmitted on the control channel. On matching, the control channel demodulation unit 206 can extract the resource allocation information from the control information associated with the TA-RNTI. The extracted resource allocation information is outputted to the demodulation unit 204 and the decoding unit 205, so that the mobile station 200 can demodulate and decode the cluster TA value addressed to the mobile 200 itself. The detail is described later.

The control information processing unit 207 extracts various control information from the output of the decoding unit 205. For example, the control information processing unit 207 extracts the TA-RNTI from the demodulated and decoded RRC control information and outputs the extracted TA-RNTI to the control channel demodulation unit 206. Also, the control information processing unit 207, for example, can extract the cluster TA value from the output of the decoding unit 205 and output to the transmission timing control unit 215.

The data processing unit 208 performs various processing such as compression encoding or the like to the user data. The processed user data is outputted to the multiplexing unit 209.

The multiplexing unit 209 multiplexes the user data and various control information (for example, RRC control information or MAC-CE control information) outputted from the data processing unit 208. The multiplexing unit 209 outputs the multiplexed signal to the symbol mapping unit 210.

The symbol mapping unit 210 performs modulation processing such as the QPSK, the 16QAM, or the like, to the multiplexed signal. The modulation scheme is designated in the base station 100 as the resource allocation information, so that, for example, the symbol mapping unit receive the resource allocation information from the control channel demodulation unit 206 and can perform the modulation processing.

The multiplexing unit 211 multiplexes the output signal from the symbol mapping unit 210 and the pilot signal, and outputs as the multiplexed signal. The pilot signal, for example, includes the known preamble pattern in the mobile station 200 and base station 100.

The FFT unit 212 converts the multiplexed signal in the time domain to the multiplexed signal in the frequency domain, by performing the Fast Fourier Transform for the multiplexed signal outputted from the multiplexing unit 211.

The frequency mapping unit 213 performs processing of mapping on a predetermined frequency band, to the multiplexed signal in the frequency domain outputted from the FFT unit 212. For example, the frequency mapping unit 213 performs mapping the multiplexed signal to a frequency band allocated to the mobile station 200 and map "0" to frequency band except the frequency band allocated to the mobile station 200. For example, this processing is also referred to as subcarrier mapping. The frequency allocated to the mobile station 200, for example, is included in the resource allocation information, and the frequency mapping unit 213 can receive the resource allocation information from the control channel demodulation unit 206. The frequency mapping unit 213 outputs the signal including the mapped multiplexed signal, to the IFFT unit 214.

The IFFT unit 214 converts the outputted signal in the frequency domain to the outputted signal in the time domain by performing the Inverse Fast Fourier Transform processing for the outputted signal from the frequency mapping unit 213.

The transmission timing control unit 215 controls the transmission timing of the radio signal transmitted from the mobile station 200, by controlling a output timing to the radio processing unit 216 with respect to the outputted signal from the IFFT unit 214. The transmission timing control unit 215 receives the cluster TA value outputted from the control information processing unit 207 and determines the transmission timing, for example, by calculating a formula below.

$$(N_{TA}+N_{TAoffset}) \cdot T_S \qquad (1)$$

Figure 24:
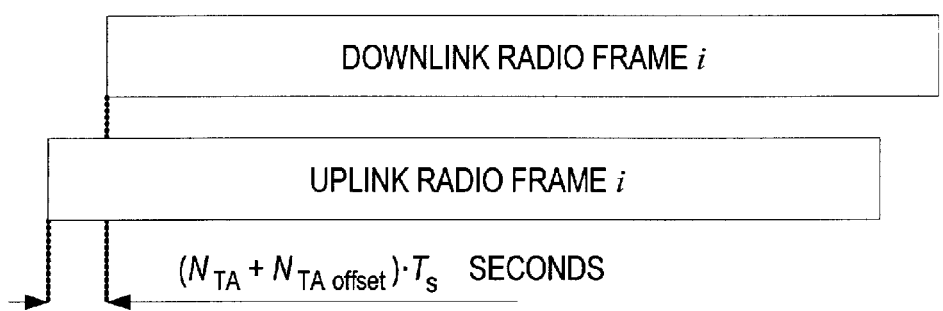
FIG. 24 is a diagram illustrating the example of a frame timing difference between a reception frame and a transmission frame.
Figure 25:
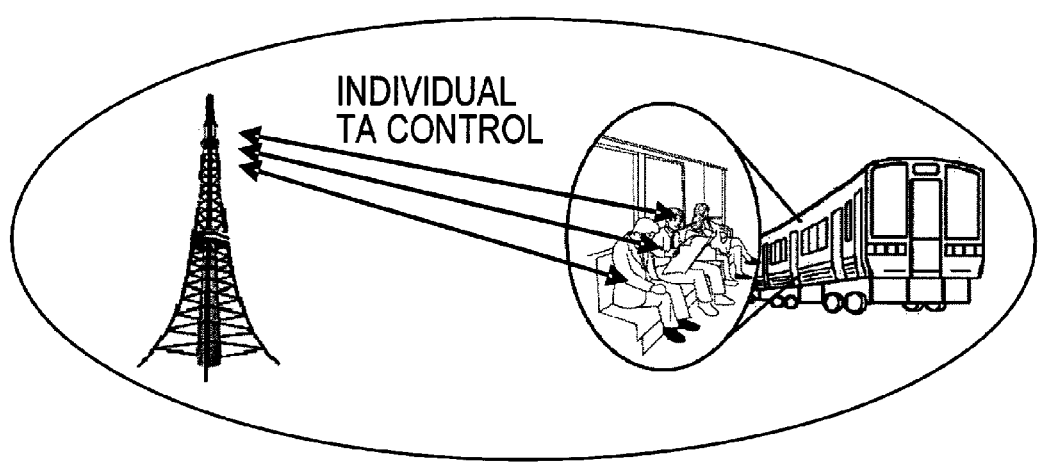
FIG. 25 is a diagram illustrating the example of a state where the transmission timing control is individually performed.

The formula (1), for example, corresponds to the transmission timing illustrated in FIG. 24. The transmission timing control unit 215, for example, outputs to the radio processing unit 216 the outputted signal from the IFFT unit 214 by a timing calculated based on the formula (1) earlier than the transmission timing of the mobile station itself. The transmission timing of the mobile station 200 itself, for example, is included in the resource allocation information demodulated by the control channel demodulation unit 206, so that the transmission timing control unit 215 can establish its own transmission timing with the use of the information. In the formula (1), the cluster TA value corresponds to "$N_{TA}$" of the formula (1), and the fixed values "$N_{TAoffset}$" and "Ts" are stored in an internal memory of the transmission timing control unit 215, the transmission timing control unit 215 appropriately reads out the fixed values, and performs the processing.

The radio processing unit 216 converts the outputted signal outputted from the transmission timing control unit 215 into the radio signal in the radio band. Accordingly, the radio processing unit 216, for example, includes the digital to analog converting unit, the frequency converting circuit, or the like. The radio signal outputted from the radio processing unit 216, for example, is transmitted to the base station 100 via the antenna 201 as a single carrier signal.

<Example of Entire Operation of Radio Communication System 10>

Next, an operational example of the radio communication system 10, the base station 100, and the mobile station 200 will be described. First, an entire operational example will be described, secondly, an operational example of the base station 100 and the mobile station 200 will be described.

Figure 6:
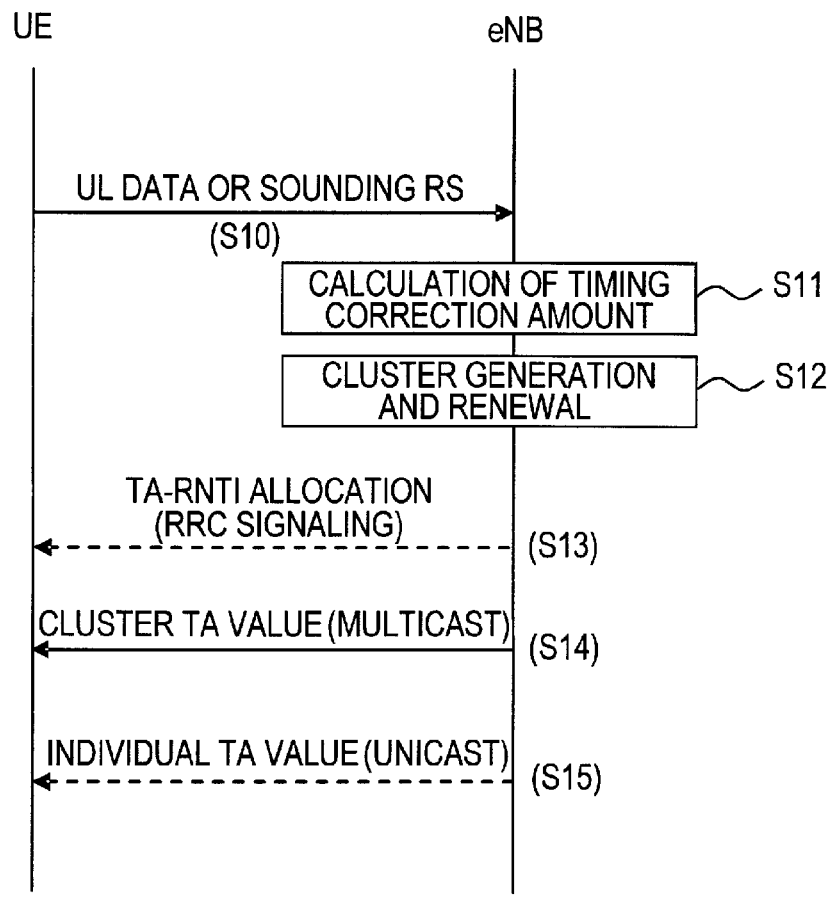
FIG. 6 is a sequence diagram illustrating the example of entire operation.

FIG. 6 is a sequence diagram illustrating the example of the entire operation of the radio communication system 10. Firstly, the mobile station 200 transmits data (or UL data) or the pilot signal (or SRS) to the base station 100 (S10). For example, the mobile station 200 can multiplex the pilot signal and the data and transmit.

The base station 100 measures the TA value of the mobile station 200 based on the received data and pilot signal, and regards the measured TA value as the timing correction amount $N_{TA}$ (S11). For example, the TA value calculation unit 117 measures the TA value.

Next, the base station 100 generates the cluster based on the measured TA value (or timing correction amount $N_{TA}$) (S12). For example, the cluster generation unit 118 can group (or cluster) between the mobile stations 200 having the TA value within a constant range.

Next, the base station 100 allocates the TA-RNTI to the generated cluster and transmits the allocated TA-RNTI to the mobile station 200 (S13). For example, in the example in FIG. 5, the base station 100 allocates the TA-RNTI such as "TA-RNTI-1" to the cluster whose identification information is "cluster 1". The base station 100 transmits the allocated TA-RNTI to the mobile station 200 as the RRC control information, for example, by using the radio resource of the PDSCH channel.

Next, the base station 100 transmits by multicast the cluster TA value to the mobile station 200 addressed to the allocated TA-RNTI (S14).

For example, the base station 100 calculates an average value with respect to the TA value of each mobile station 200 in the generated cluster and uses the average value as a representative value, thereby obtaining the cluster TA value, or uses the maximum number of the TA value as the representative value, thereby obtaining the cluster TA value. When the mobile station 200 receives the cluster TA value, the mobile station 200 calculates the formula (1), determines the transmission timing, and transmits data or the like at the transmission timing. Accordingly, in the base station 100, the reception timing regarding the data from the mobile station 200 can make a match to the frame timing. For example, a difference between the reception timings regarding the data from the respective mobile stations 200 falls within a CP length. Accordingly, a discrepancy in the reception timings can be prevented and reception quality can be maintained in the base station 100.

Next, the base station 100 generates the individual TA value with respect to the mobile station 200, in which a discrepancy in synchronization is higher than a threshold value in the cluster, and transmits the individual TA value to the mobile station 200, so that the base station 100 performs correction of the transmission timing control of the mobile station 200 (S15). To the mobile station 200 in the cluster, the transmission timing is determined by the cluster TA value. However, thereafter, there is a case where the reception frame timing based on the cluster TA value is increased higher than a threshold value. The base station 100 takes this case into consideration and performs the correction of the transmission timing to the mobile stations 200 in the cluster. When the discrepancy in synchronization is further continued, the base station 100 incorporates the mobile station 200 into other cluster or individually performs the transmission timing control. The detail is described later.

<Example of Operations of Base Station 100>

Figure 7:
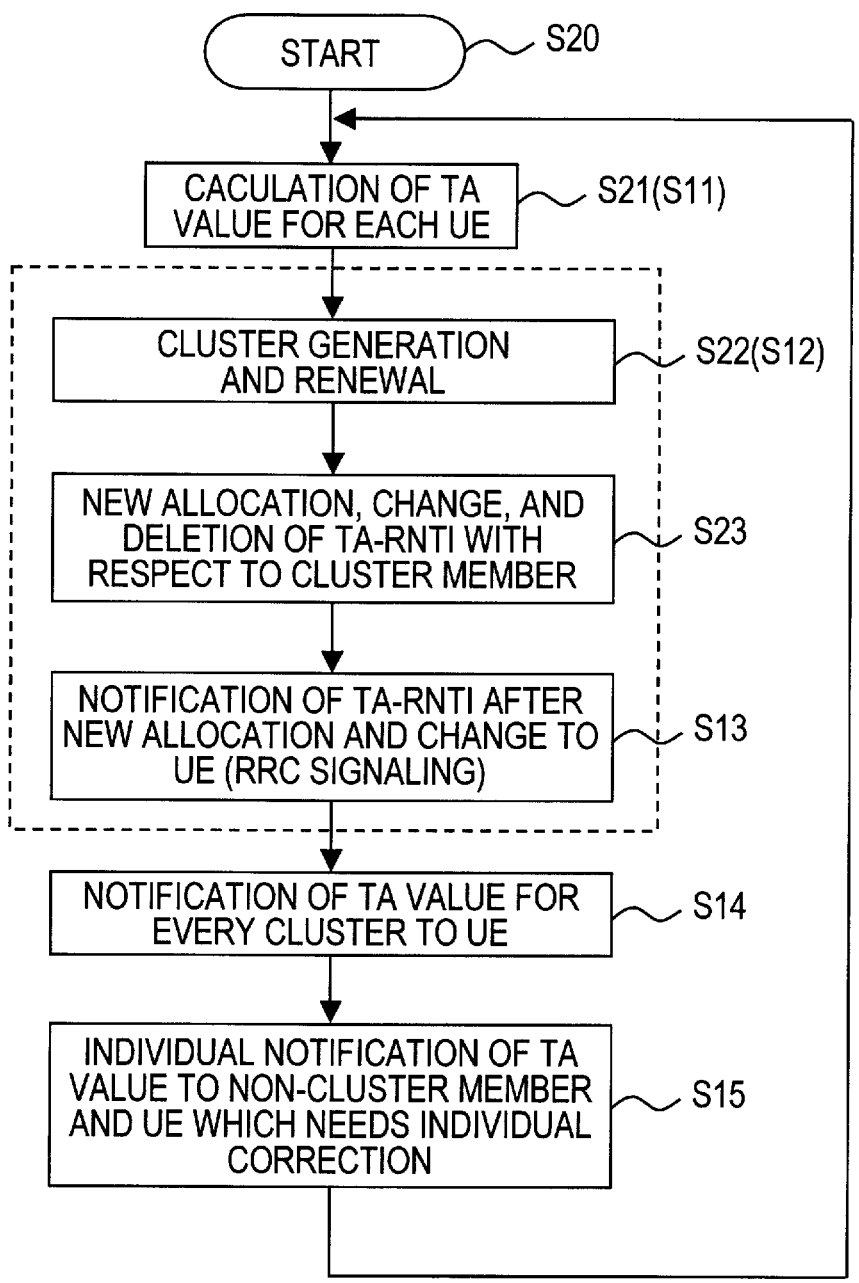
FIG. 7 is a flowchart illustrating the example of operations of the base station apparatus.

Next, an operational example of the base station 100 will be described. FIG. 7 is a flowchart illustrating the operational example of the base station 100. In FIG. 7, same reference numerals are applied for the steps of the same processing as in FIG. 6.

When the base station 100 starts the processing (S20), the base station 100 calculates the TA value based on the data and reference signal transmitted from each mobile station 200 (S21 (or S11)). For example, the TA value calculation unit 117 calculates the TA value.

Next, the base station 100 generates the cluster (S22 (or S12)). For example, the cluster generation unit 118 groups the mobile stations 200 whose TA value falls within the constant range, based on the TA value of the mobile station 200 from the TA value calculation unit 117, and generates the cluster.

Next, the base station 100 newly allocates TA-RNTI for cluster members (S23). For example, the radio resource control unit 101 newly allocates the same TA-RNTI for the mobile stations 200 which belong the same cluster, based on the information on the cluster outputted from the cluster generation unit 118.

Next, the base station 100 transmits the newly allocated TA-RNTI to the mobile stations 200 (S13). For example, the radio resource control unit 101 outputs the allocated TA-RNTI to the packet generation unit 103 as the RRC control information. Accordingly, the newly allocated TA-RNTI is transmitted to each mobile station 200 belonging to the same cluster. When other cluster is generated, the base station 100 can newly allocate and transmit other TA-RNTI corresponding to other cluster.

Figure 8A:
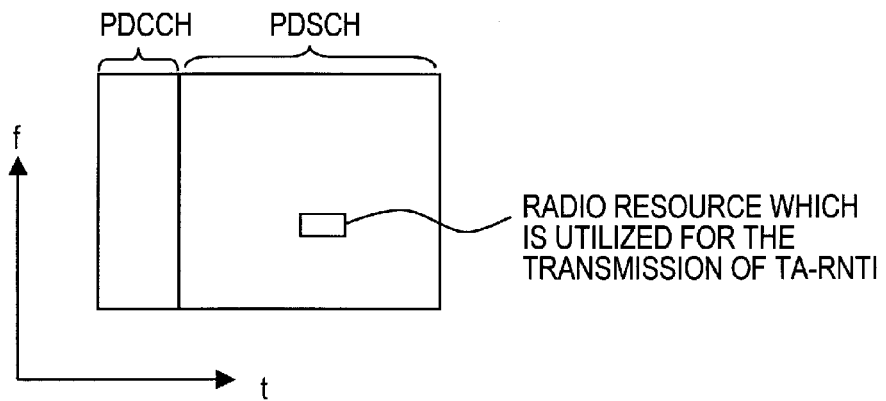
FIGS. 8A and 8B are diagrams illustrating the example of radio resource allocation.

FIG. 8A is a diagram illustrating an allocation example of radio resource for the TA-RNTI. A vertical axis represents a frequency domain, and a horizontal axis represents a time domain, and control information and the like are transmitted as a control signal by using radio resource of the PDCCH, and data and the like are transmitted as a data signal by using radio resource of the PDSCH. For example, the radio resource control unit 101 allocates the TA-RNTI on the radio resources of PDSCH, so that the TA-RNTI is transmitted through the PDSCH channel.

Returning to FIG. 7, next, the base station 100 transmits by multicast the cluster TA value to the mobile station 200 (S14). For example, the MAC control unit 102 receives via the cluster generation unit 118 and the radio resource control unit 101, the TA value of each mobile station 200 belonging to the cluster, which is calculated by the TA value calculation unit 117, and calculates the cluster TA value as the representative value from each TA value. When a plurality of clusters is generated, the MAC control unit 102 calculates the cluster TA values in accordance with the number of the generated clusters. It is noted that, for example, when the radio resource control unit 101 is notified of notification of the calculation of the TA value from the MAC control unit 102, the radio resource control unit 101 allocates the radio resource for the cluster TA value.

Figure 8B:
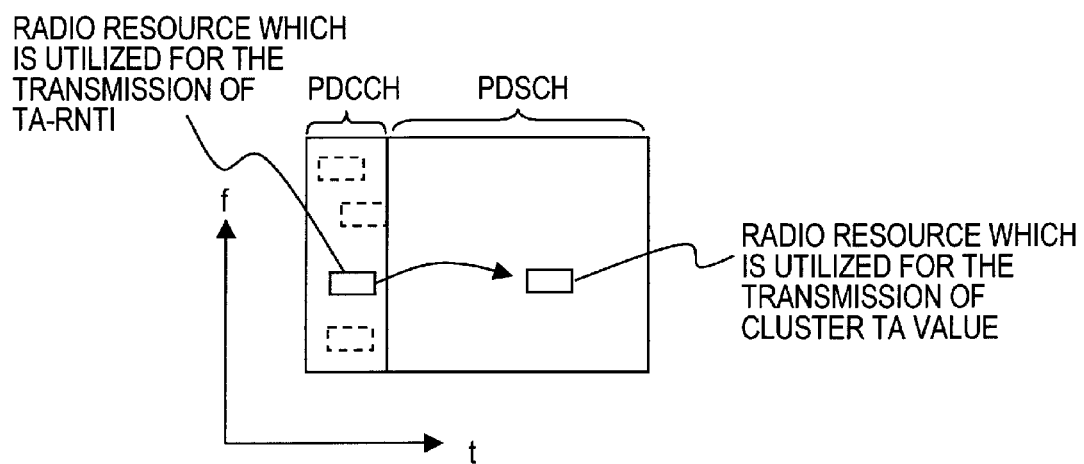

FIG. 8B is a diagram illustrating an example of radio resource allocation for the cluster TA value. The radio resource control unit 101, for example, specifies a group of destination to the cluster TA value, and extracts the TA-RNTI corresponding to the group based on the newly allocated TA-RNTI. Then, the radio resource control unit 101 allocates the extracted TA-RNTI on the radio resource of the PDCCH, and allocates the cluster TA value on the radio resource of the PDSCH. The radio resource control unit 101 generates the control information associated with the TA-RNTI and makes the control information to include the resource allocation information of the cluster TA value. The radio resource control unit 101 outputs to the multiplexing unit 107 the extracted TA-RNTI and the control information associated with the TA-RNTI. Accordingly, for example, the cluster TA value is transmitted to the mobile station 200 according to the radio resources illustrated in FIG. 8B.

When attention is paid to the example of the radio resource illustrated in FIG. 8B, the TA-RNTI allocated for the PDCCH is addressed to the plurality of mobile stations 200 in the same cluster and shared by one radio resource (or radio resource block). Also, the PDSCH radio resource on which the cluster TA value is allocated is a radio resource shared and used by the plurality of mobile stations 200. Accordingly, the radio resource control unit 101 does not allocate a different radio resource for the plurality of mobile stations 200 with regards to the cluster TA value, but can allocate a common radio resource in unit of cluster. Consequently, the base station 100 can transmit by multicast the cluster TA value to each mobile station 200 in the cluster.

Returning to FIG. 7, the base station 100 transmits the individual TA value to non cluster member and the mobile stations 200 which individually perform correction (S15).

Regarding the present processing, there are two types of processing, which includes the transmission of the individual TA value to the non cluster member and the transmission of the individual TA value to the mobile station 200 which individually perform correction. As to the description of the transmission of the individual TA value to the non cluster member, the non cluster member, for example, is the mobile station 200 which does not be clustered. The base station 100 transmits the individual TA value by using the C-RNTI, to this mobile station 200. The individual TA value, for example, is a TA value calculated by the TA value calculation unit 117 and a TA value of the non cluster member. The processing in the case of individually performing correction will be described. For example, the TA value calculation unit 117 calculates each the TA value of the cluster member, and the MAC control unit 102 compares the calculated TA value with an individual correction threshold value. When the former is higher than the latter, the MAC control unit 102 determines that the individual correction is performed. For example, in the course of the two types of processing, the MAC control unit 102 outputs the calculated TA value or the TA value of the mobile stations 200 which does not be clustered, as the individual TA value, to the packet generation unit 103, and the radio resource control unit 101 allocates the radio resource to transmit the individual TA value. For example, the radio resource control unit 101 performs allocation of the radio resource to the individual TA value to transmit the individual TA value by the PDSCH channel, and outputs the individual TA value to the packet generation unit 103. The individual TA value in this case, for example, is also transmitted by using the PDSCH, but the resource allocation information on the radio resource of the individual TA value is included in the control information associated with the C-RNTI. For example, the radio resource control unit 101 generates the control information and C-RNTI, and outputs the control information and the C-RNTI to the multiplexing unit 107 to be transmitted by using the PDCCH.

Then, the processing returns to S21, and the base station 100 repeats the aforementioned processing.

Furthermore, after the base station 100 performs the individual correction for the cluster member, the base station deletes the mobile station in which a discrepancy in synchronization is continued, from the allocated cluster, and incorporates into other cluster, or performs normal individual control by the C-RNTI. Accordingly, for example, the base station 100 calculates the TA value of the cluster member (S21), and when the calculated TA value is higher than the individual correction threshold value again, the base station 100 deletes the mobile stations 200 from the cluster member. For example, when the calculated TA value is higher than the individual correction threshold value, the cluster generation unit 118 deletes the mobile stations 200 from the cluster member. Also, the cluster generation unit 118 determines whether or not the calculated TA value falls within the constant range with respect to the TA value of other cluster member. When the calculated TA value falls within the constant range, the cluster generation unit 118 incorporates the mobile stations 200 into the other cluster member. In contrast, when the calculated TA value does not fall within any cluster range, the cluster generation unit 118 determines that the mobile station 200 does not belong to any cluster. Accordingly, the cluster is renewed (S22), the cluster generation unit 118 outputs information regarding the renewed cluster (including information regarding the mobile stations 200 that do not belong to any cluster) to the MAC control unit 102. The MAC control unit 102 allocates the TA-RNTI based on the renewed cluster. Accordingly, the changed TA-RNTI is allocated for the renewed cluster member (S23). It is noted that, the MAC control unit 102, for example, outputs the calculated TA value to the multiplexing unit 107 to perform the individual transmission timing control to the mobile station 200 that do not belong to any cluster. For example, the radio resource control unit 101 generates the control information associated with the C-RNTI and makes the control information to include the resource allocation information of the individual TA value allocated on the radio resource of the PDCCH. Accordingly, the radio resource control unit 101 can transmit the individual TA value by using the radio resource of PDCCH.

<Example of Operations of Mobile Station 200>

Figure 9:
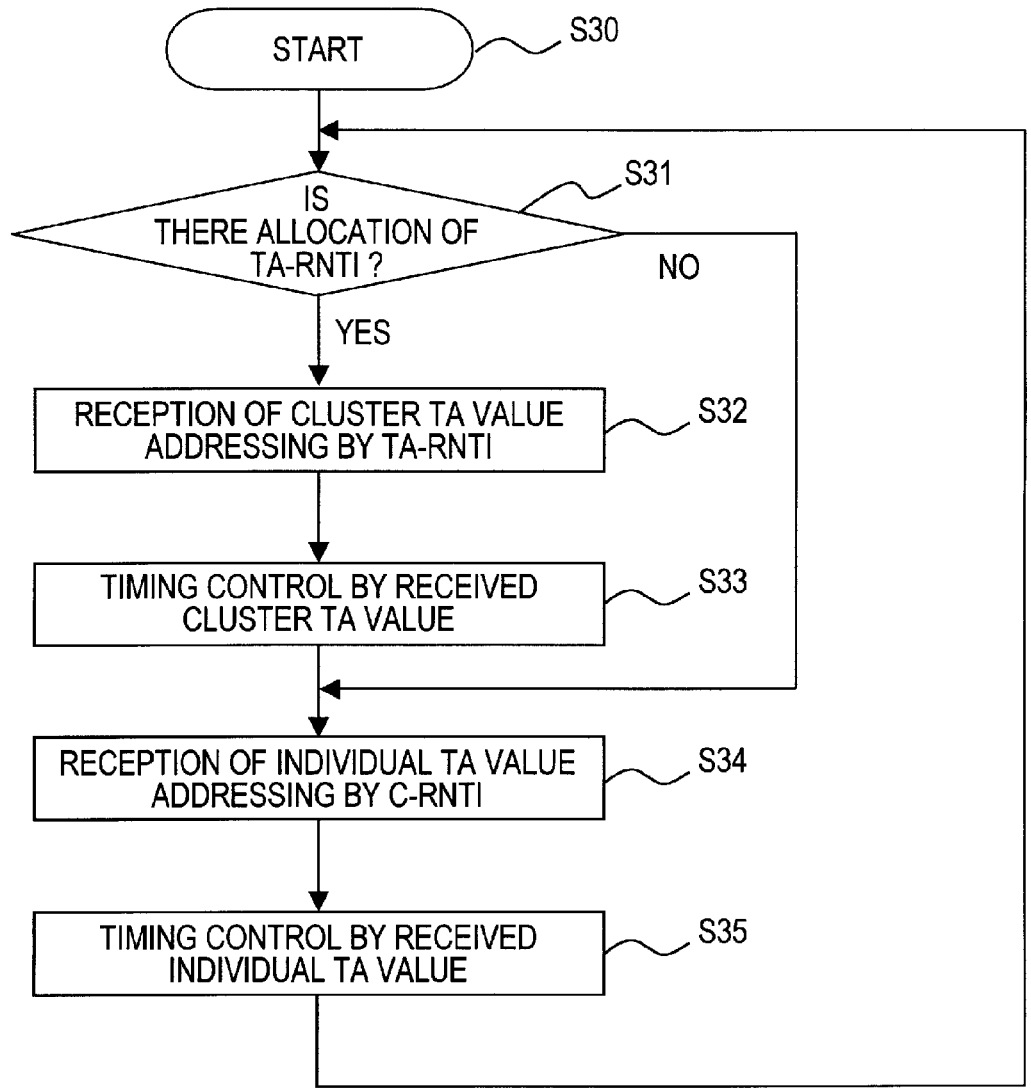
FIG. 9 is a flowchart illustrating the example of the operations of the mobile station apparatus.

Next, an operational example of the mobile station 200 will be described. FIG. 9 is a flowchart illustrating the operational example of the mobile station 200. The processing illustrated in FIG. 9 is performed when the transmission of the radio signal is performed between the base station 100 and the mobile station 200, for example, after the mobile station 200 transmits the data signal or the reference signal (or SRS) to the base station 100.

Upon the start of the processing (S30), the mobile station 200 determines whether or not there is the allocation of the TA-RNTI (S31). For example, the determination can be made based on whether or not the control information processing unit 207 of the mobile station 200 can extract the TA-RNTI from the decoding unit 205. In this case, for example, the TA-RNTI is received by using the PDSCH.

When there is the allocation of the TA-RNTI (S31, YES), the mobile station 200 receives the cluster TA value to be addressing by the TA-RNTI (S32). For example, the control channel demodulation unit 206 receives the TA-RNTI received via the control channel such as the PDCCH and determines whether or not the received TA-RNTI corresponds to the TA-RNTI received from the control information processing unit 207. Then, for example, when the control channel demodulation unit 206 determines that the received TA-RNTI corresponds, the control channel demodulation unit 206 extracts the resource allocation information of the cluster TA value from the control information associated with the received TA-RNTI and outputs the resource allocation information to the demodulation unit 204 and the decoding unit 205. Accordingly, the mobile station 200 can demodulate and decode the cluster TA value addressing by the TA-RNTI and transmitted by the PDSCH.

Next, the mobile station 200 performs the transmission timing control based on the received cluster TA value (S33). For example, the control information processing unit 207 outputs the demodulated and decoded cluster TA value to the transmission timing control unit 215, and the transmission timing control unit 215 calculates the formula (1) in accordance with the cluster TA value. The transmission timing control unit 215, for example, outputs the processed data by FFT or the like to the radio processing unit 216 by a calculated value based on the formula (1) earlier than the transmission frame timing of the mobile station 200 itself.

Next, the mobile station 200 receives the individual TA value addressing by the C-RNTI (S34). For example, when the control channel demodulation unit 206 receives the C-RNTI addressed to the mobile station itself, the control channel demodulation unit 206 extracts the resource allocation information of the individual TA value from the control information associated with the C-RNTI. Then, the control channel demodulation unit 206 outputs the extracted resource allocation information to the demodulation unit 204 and the decoding unit 205. Accordingly, the individual TA value addressed to the mobile station 200 is demodulated and decoded.

Next, the mobile station 200 performs the transmission timing control by the received individual TA value (S35). For example, the control information processing unit 207 outputs the demodulated and decoded individual TA value to the transmission-timing control unit 215, and the transmission timing control unit 215 calculates the formula (1) again for the timing correction amount $N_{TA}$ based on the individual TA value and adjusts the transmission timing. Accordingly, the transmission timing of the mobile stations 200 of the cluster member, in which the discrepancy in synchronization is increased, is controlled, so that the reception timing in the base station 100 synchronizes with the frame timing.

Then, the processing goes to S31 again, and the mobile stations 200 can repeat the aforementioned processing.

When the discrepancy in synchronization is continued in the mobile stations 200, the mobile stations 200 receives the renewed TA-RNTI from the base station 100, or performs the individual control based on the C-RNTI. When the renewed TA-RNTI is received, the mobile station 100 performs the processing of S31 again. In contrast, when the individual control is performed based on the C-RNTI, the step goes to the processing of S31 again, and "No" is selected at S31, and the processing of S34 is performed.

When the individual control is performed based on the C-RNTI, at S34, the mobile stations 200 receives the individual TA value addressing by the C-RNTI. In this case, the resource allocation information on PDCCH is the control information associated with the C-RNTI. For example, the control channel demodulation unit 206 of the mobile stations 200 demodulates the individual TA value from the PDCCH in accordance with the resource allocation information, and outputs the individual TA value to the transmission timing control unit 216 via the control information processing unit 207. Accordingly, the individual transmission timing control is performed by the individual TA value in the mobile stations 200.

Figure 10:
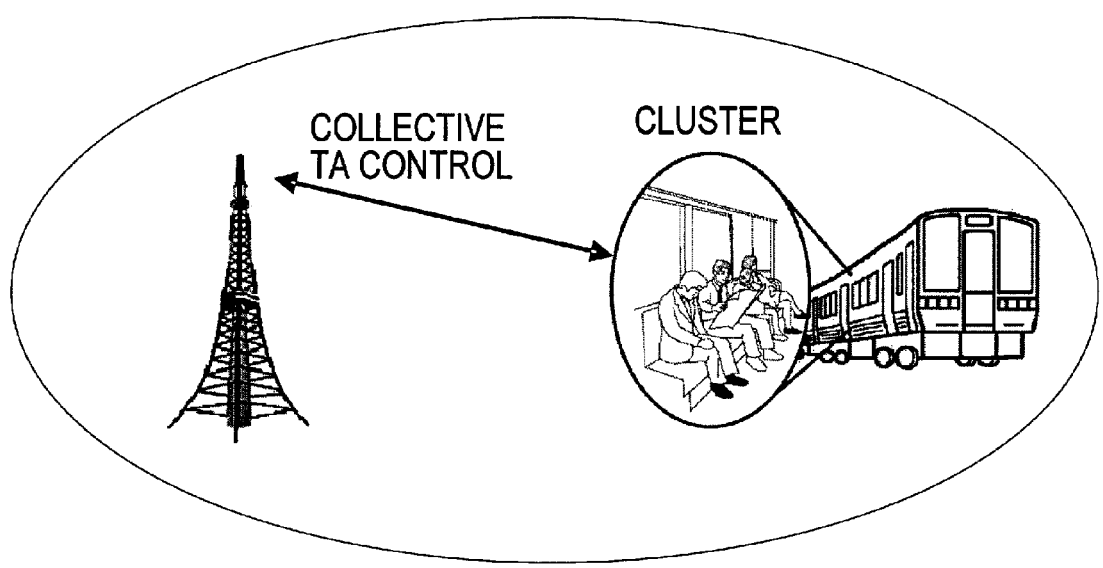
FIG. 10 is a diagram illustrating the example of a state where transmission timing control is collectively performed.

Thus, the radio communication system 10 of the second embodiment of the present invention can collectively perform the transmission timing control for the plurality of mobile stations 200 belonging to the same cluster. FIG. 10 is a diagram illustrating a state where the transmission timing control is collectively performed. When the plurality of mobile stations 200 is placed on the same train, the transfer speed of the plurality of mobile stations 200 is equal, and the TA values measured by the base station 100 respectively fall within the constant range. The base station 100 groups the plurality of mobile stations 200 and collectively performs the transmission timing control by the same TA value (or cluster TA value).

On the other hand, a portion illustrated by a dotted line in FIG. 8B represents an example of the allocation of radio resources in a case where the TA command is transmitted with the use of the PDCCH individually for every mobile station 200. Thus, when the transmission timing control is individually performed for every mobile station 200, a plurality of radio resources (or radio resource blocks) on the PDCCH is utilized.

However, in the second embodiment of the present invention, the base station 100 carries out the grouping or clustering with respect to the plurality of mobile stations 200, so that the transmission of the cluster TA value is in units of cluster, and one radio resource is used for the cluster unit in the PDCCH. In the second embodiment of the present invention, one radio resource block is used in the PDCCH, so that the overhead due to the transmission of the control signal can be reduced, compared with the individual transmission timing control in which the plurality of radio resource blocks is used.

In the second embodiment of the present invention, for example, the cluster TA value (S14) and the individual TA value (S15) which are transmitted as the TA command may be provided as a differential value (or a relative value) with respect to the representative value previously calculated. The overhead of the TA command can be reduced, compared with a case where an absolute value precisely corresponding to the TA value is transmitted. In the case of the cluster TA value, for example, the MAC control unit 102 holds the absolute value of the cluster TA value previously calculated, calculates the representative value such as the average value, based on each TA value received from the TA value calculation unit 117, and further calculates a differential value between the absolute value of the held TA value and the calculated representative value. Then, the MAC control unit 102 outputs the differential value to the packet generation unit 103 as the cluster TA value. Accordingly, the MAC control unit 102, for example, can store the absolute value of the TA value previously calculated or the like in the internal memory or the like. As to the individual TA value, the MAC control unit 102 calculates a differential value between the absolute value of the TA value previously calculated and the TA value of the mobile station 200 in which the discrepancy in synchronization occurs, and outputs the differential value to the packet generation unit 103 as the individual TA value.

In contrast, regarding the mobile station 200, the control information processing unit 207 holds the absolute value previously calculated, can obtain the cluster TA value, which is an absolute value, by adding or subtracting the relative value to be received, and outputs the cluster TA value to the transmission timing control unit 215.

However, in the second embodiment of the present invention, it may be such that the cluster TA value and the individual TA value are not differential values but absolute values.

Third Embodiment

Next, the third embodiment of the present invention will be described. In the second embodiment of the present invention, for example, as is illustrated in FIG. 5, the example in which the grouping or the clustering of the mobile station 200 is performed based on the TA value is described. This TA value is a TA value at a certain time. For example, when the plurality of mobile stations is respectively placed on a bus and a train, and the plurality of mobile stations in the bus and the train respectively travel in the different direction, and the travelling speeds of the bus and the train are equal, the TA value falls within the certain range. In this case, the same cluster is allocated for the plurality of mobile stations 200 in the bus and the plurality of mobile stations 200 in the train. In the third embodiment of the present invention, the grouping is performed for the plurality of mobile stations 200 in which a time fluctuation amount ΔTA of the TA value in a certain period of time falls within the certain range, so that precise transmission timing control can be performed, compared with the second embodiment, and the discrepancy in reception timings in the base station 100 can be prevented.

Figure 11:
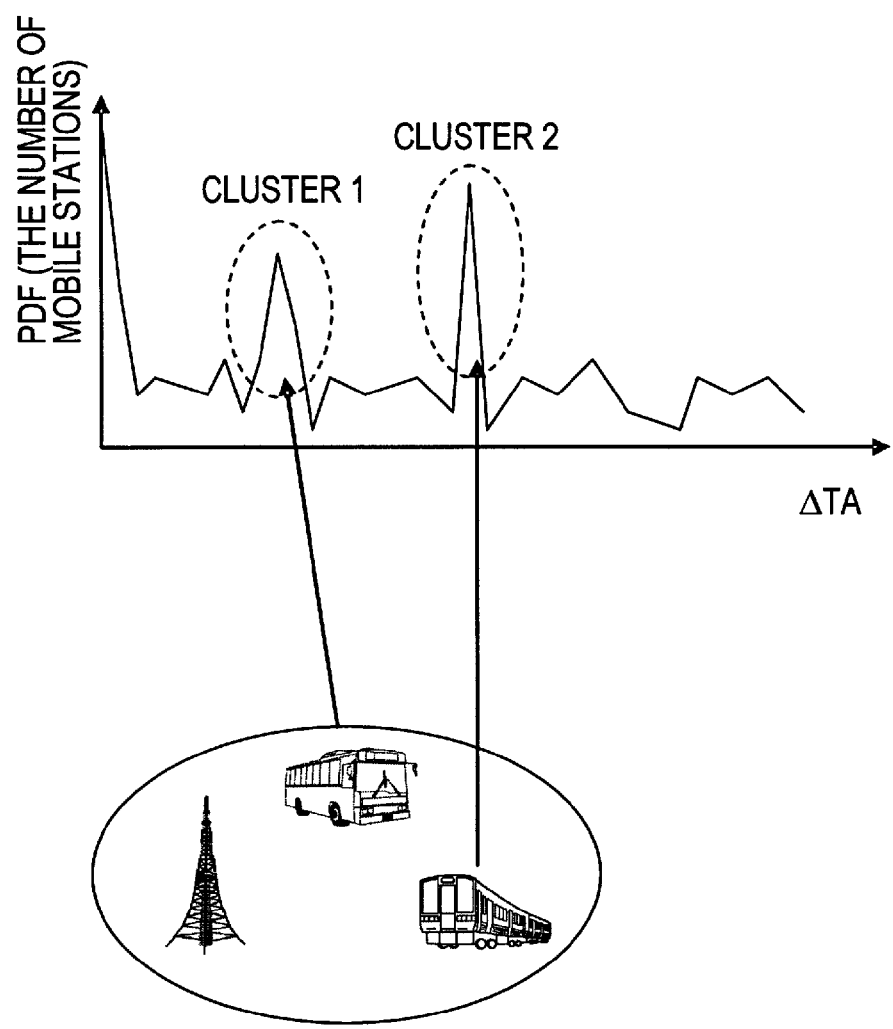
FIG. 11 is a graph illustrating the example of distribution of the time fluctuation amount ΔTA of the TA value.

FIG. 11 is a graph illustrating a distribution example of the time fluctuation amount ΔTA of the TA value, wherein a vertical axis represents the number of mobile stations, and a horizontal axis represents the time fluctuation amount ΔTA respectively. For example, the fluctuation amounts of travelling speed in the bus and train are substantially different in terms of the lapse of time, and the amount of reception timing error in the base station 100 with respect to each mobile station 200 in the bus and in the train is also different along with the lapse of time. Accordingly, for example, as is illustrated in FIG. 11, the time fluctuation amount ΔTA of the plurality of mobile stations 200 in the bus falls within the certain range, and the time fluctuation amount ΔTA of the plurality of mobile stations 200 in the train is distributed within another range. The time fluctuation amount ΔTA, for example, can be mentioned as the fluctuation amount of the reception timing error in the base station 100. In the example of FIG. 11, the plurality of mobile stations 200 in the bus are grouped as "cluster 1", and the plurality of mobile stations 200 in the train are grouped as "cluster 2". Then, the transmission timing control is collectively performed in the two clusters respectively. Accordingly, for example, the example of the configuration of the radio communication system 10 can be illustrated by FIG. 2, and the examples of the configuration of the base station 100 and the mobile station 200 can be illustrated by FIGS. 3 and 4, as is the same case with the second embodiment of the present invention. In the third embodiment of the present invention, for example, the TA value calculation unit 117 calculates the TA value for a certain constant period of time and calculates the time fluctuation amount ΔTA of the TA value, and the cluster generation unit 118 generates the cluster based on the time fluctuation amount ΔTA.

As is the same case with the second embodiment of the present invention, the example of the entire operation can be illustrated by FIG. 6. However, the base station 100 carries out generation (S12) of the cluster based on the time fluctuation amount ΔTA of the TA value.

Figure 12:
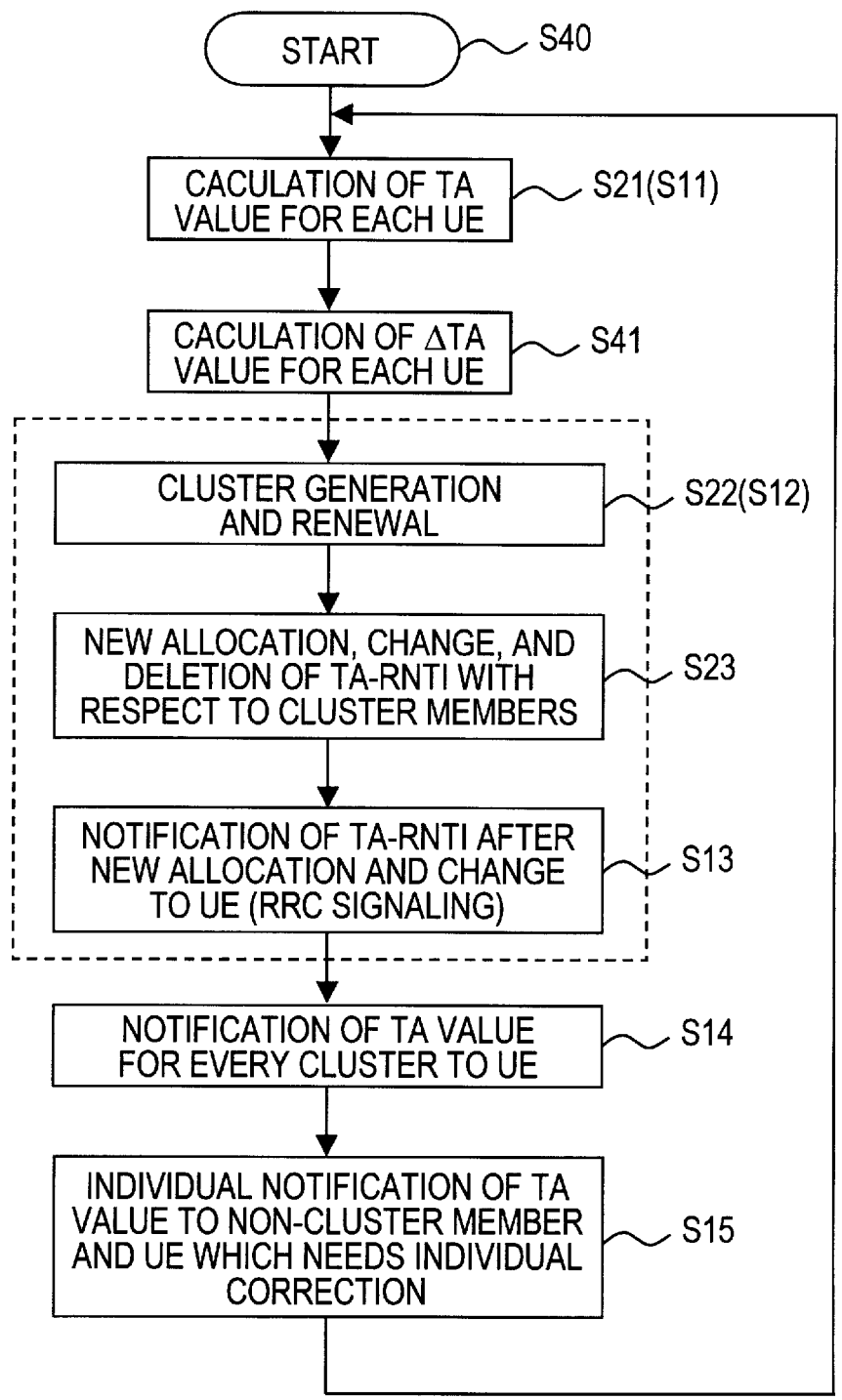
FIG. 12 is a flowchart illustrating the example of the operation of the base station apparatus.

FIG. 12 is a flowchart illustrating an operational example of the base station 100. When the base station 100 measures the TA value (S21), the base station 100 calculates the TA value after the lapse of a predetermined time. For example, the TA value calculation unit 117 measures the TA value after the lapse of one radio frame period to transmit the reference signal for each radio frame period by the mobile station 200.

Then, the base station 100 calculates a difference between the two TA values to be measured, so that the base station 100 calculates the time fluctuation amount ΔTA of the TA value (S41). For example, the TA value calculation unit 117 obtains the time fluctuation amount ΔTA by calculating a difference between the measured TA value and the TA value after the lapse of one radio frame period. For example, the TA value calculation unit 117 is not limited to the TA value after the lapse of one radio frame period, but may use a TA value after the lapse of plural radio frame periods, one or plural symbol timings, one or plural slot timings, or measures a predetermined time after the measurement of a TA value at first and uses a TA value after the lapse of the predetermined time.

Next, the base station 100 generates the cluster from the time fluctuation amount ΔTA of the TA value (S22). In this case, for example, the TA value calculation unit 117 outputs the calculated time fluctuation amount ΔTA, to the cluster generation unit 118, and the cluster generation unit 118 groups the plurality of mobile stations 200 whose time fluctuation amount ΔTA falls within the constant range, and generates the cluster (S22). Thereafter the processing can be carried out as the same case with the second embodiment of the present invention.

In contrast, in the mobile station 200, consequently, the allocation of TA-RNTI (S31) and the reception of the cluster TA value (S32 to S33) can similarly be carried out as described in the second embodiment of the present invention. Accordingly, as is the same case with the second embodiment of the present invention, the entire operation example of the mobile station 200 can be carried out according to the example of the operation illustrated in FIG. 9.

As is the same case with the second embodiment of the present invention, in the third embodiment of the present invention, the transmission timing control can collectively be performed for the plurality of mobile stations 200 belonging to the same cluster. Also, in the third embodiment of the present invention, the cluster TA value can be transmitted with one radio resource block in unit of the cluster on the PDCCH. Accordingly, in the third embodiment of the present invention, the radio resource of the PDCCH can be reduced, and the overhead of the control signal can be reduced, compared with the example of the individual transmission timing control in which the TA value is individually transmitted for each mobile station 200.

Fourth Embodiment

Next, the fourth embodiment of the present invention will be described. In the second and third embodiments of the present invention, the example is described where the cluster TA value is transmitted by multicast based on the TA-RNTI or the like. In the fourth embodiment of the present invention, the example will be described where the cluster TA value is transmitted as the broadcast information.

Figure 13A:
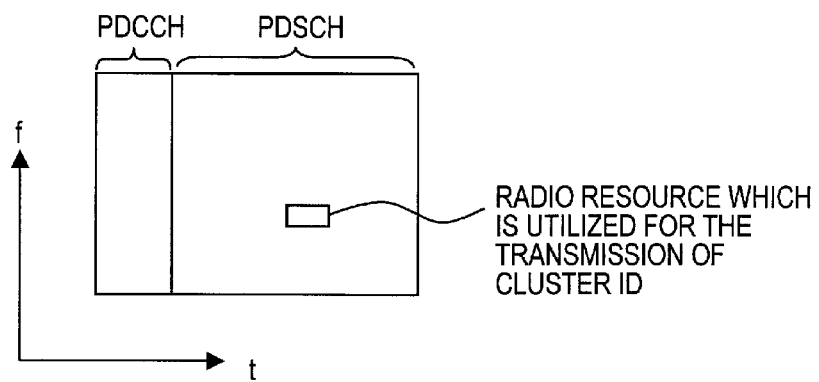
FIGS. 13A and 13B are diagrams illustrating the example of the radio resource allocation.
Figure 13B:
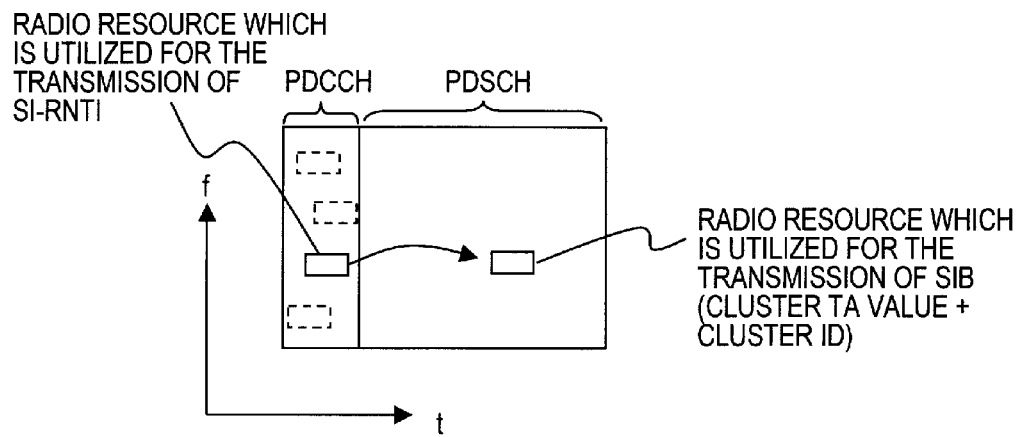

For example, the broadcast information is transmitted from the base station 100 on a cycle of 80 ms or more in units of SIB (System Information Block). FIG. 13B is a diagram illustrating the example of radio resource allocation of the broadcast information. In the example of FIG. 13B, SIB is allocated on the radio resource of PDSCH, and SI-RNTI (System Information-RNTI) is allocated on the radio resource of PDCCH. In the mobile station 200, when the SI-RNTI that corresponds with the allocated SI-RNTI in advance is obtained from the radio resource of the PDCCH, the resource allocation information of SIB included in the control information associated with the SI-RNTI is extracted. The mobile station 200 can receive the broadcast information (for example, the cluster TA value is included) included in SIB from the extracted resource allocation information. The allocated SI-RNTI of the mobile station 200, for example, is included in the information that the base station 100 transmits in advance, and is held in the internal memory of the control channel demodulation unit 206. The SI-RNTI, for example, is an identifier used to receive the broadcast information transmitted by SIB in the mobile station 200.

In the fourth embodiment of the present invention, as is the same case with the second and third embodiments of the present invention, the example of the configuration of the radio communication system 10 can be illustrated, for example, by FIG. 2. Also, the examples of the configuration of the base station 100 the mobile station 200 can be illustrated by FIGS. 4 and 5 respectively, as is the same case with the second and third embodiments of the present invention.

<Example of Entire Operation>

Figure 14:
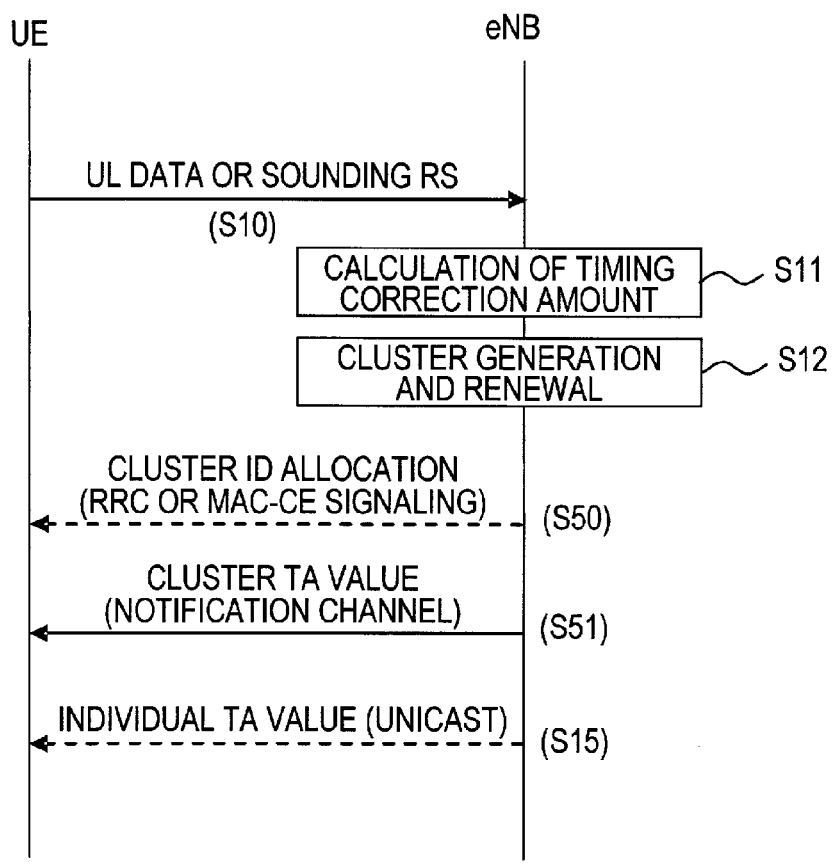
FIG. 14 is a flowchart illustrating the example of the entire operation.

Next, an entire operational example of the fourth embodiment of the present invention will be described. FIG. 14 is a sequence diagram illustrating the example of the entire operation.

When the base station 100 generates the cluster, the base station 100 allocates a cluster ID for the cluster (or group) and transmits the cluster ID to each mobile station 200 belonging to the cluster (S50). In the second and third embodiments of the present invention, the TA-RNTI is transmitted to the mobile station 200 of the same cluster (or group) (S13). However, in the fourth embodiment of the present invention, the cluster ID is transmitted in replace of the TA-RNTI. The cluster ID, for example, is an identifier used to identify the grouped mobile station 200, and an identifier for the plurality of mobile stations 200 that are controllable based on the same control amount of transmission timing. For example, the cluster ID is transmitted as MAC-CE (Media Access Control-Control Element) control information. In this case, for example, the MAC-CE control information is transmitted by using the radio resource of the PDSCH (for example, FIG. 13A).

Figures 16, 17:
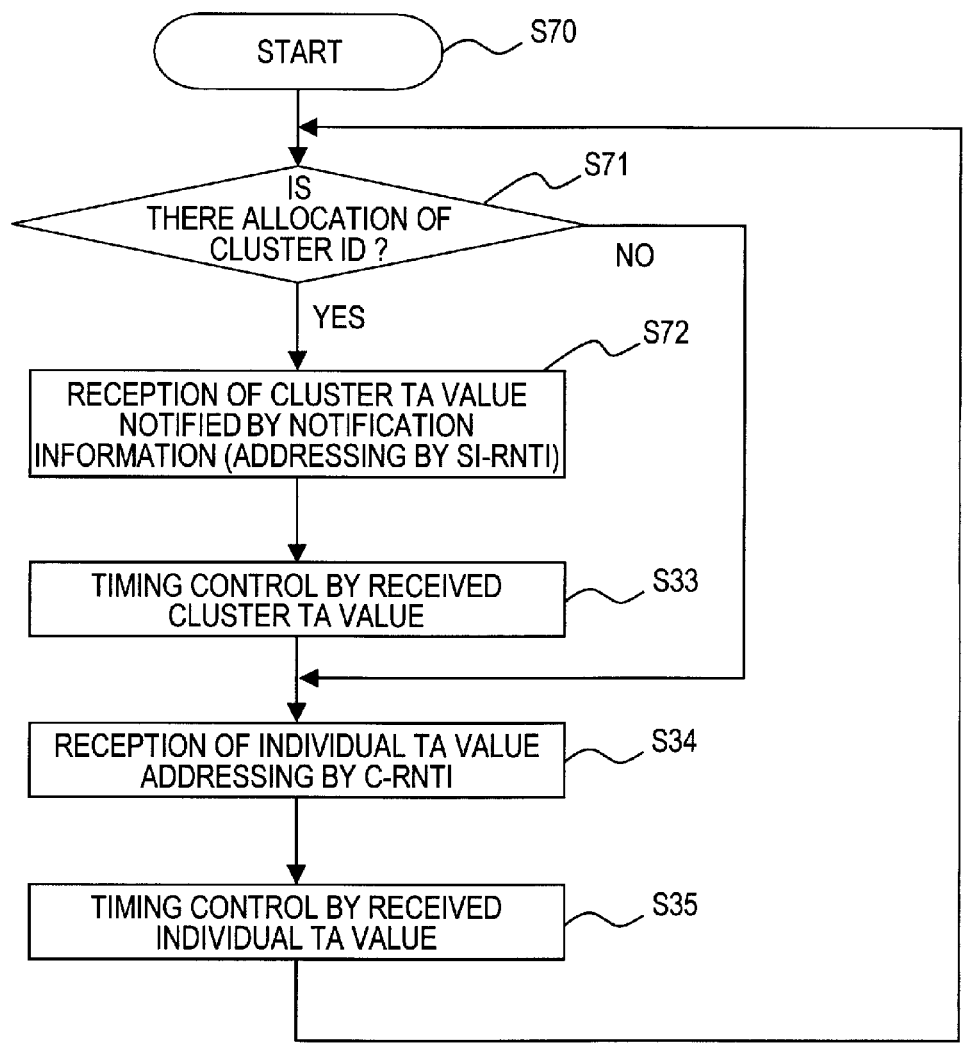
FIG. 16 is a flowchart illustrating the example of operations of the mobile station apparatus.
FIG. 17 is a diagram illustrating the example of the configuration of notification information.

Next, the base station 100 transmits the cluster TA value as the broadcast information (S51). The base station 100, for example, allocates the SI-RNTI on the radio resource of the PDCCH, allocates the cluster ID and the cluster TA value on the radio resource of PDSCH, and transmits the cluster ID and the cluster TA value (for example, FIG. 13B). FIG. 17 is a diagram illustrating the example of the configuration of one portion (the cluster ID and the cluster TA value) of the broadcast information transmitted to the mobile stations 200. The broadcast information is made up of the cluster ID and the cluster TA value as a pair and includes the pairs corresponding to the number of clusters generated by the base station 100.

The mobile stations 200 received the broadcast information can receive the cluster TA value addressed to themselves and perform the transmission timing control in accordance with the cluster TA value. Thereafter the processing can similarly be carried out as described in the second embodiment.

<Operation Example of Base Station 100>

Figure 15:
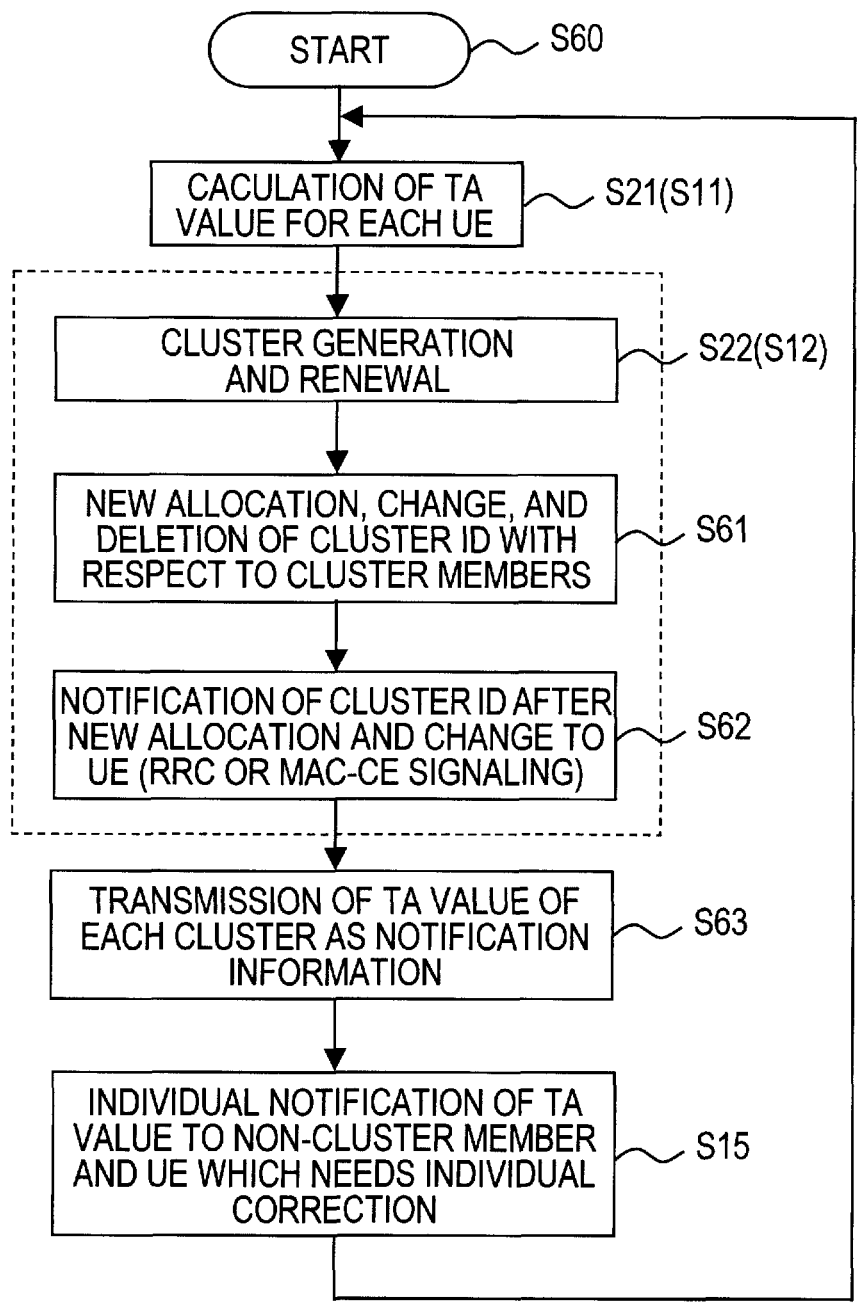
FIG. 15 is a flowchart illustrating the example of operations of the base station apparatus.

Next, an operational example of the base station 100 will be described. FIG. 15 is a flowchart illustrating the operational example of the base station 100. The same reference number is provided for the step of the same processing as that of the second embodiment of the present invention.

After the generation of the cluster, the base station 100 further newly allocates the cluster ID for the generated cluster member (S61). For example, the MAC control unit 102 receives information regarding the cluster from the cluster generation unit 118, allocates the cluster ID for the plurality of mobile stations 200 of the same group, so that the present processing is performed.

Next, the base station 100 transmits the newly allocated cluster ID, to each mobile stations 200 belonging to the cluster (S62). For example, the MAC control unit 102 transmits the allocated cluster ID, to the packet generation unit 103 as MAC-CE control information. Also, for example, when the radio resource control unit 101 receives a notification regarding the allocation of the cluster ID from the MAC control unit 102, the radio resource control unit 101 allocates the cluster ID on the radio resource of the PDSCH (for example, FIG. 13A).

Next, the base station 100 transmits the cluster ID and the cluster TA value as the broadcast information (S63). For example, as is the same case with the second embodiment of the present invention, the MAC control unit 102 calculates the cluster TA value as the representative value based on the TA value from the TA value calculation unit 117. Then, for example, the MAC control unit 102 outputs the cluster TA value and the cluster ID generated at S62 as the broadcast information to the packet generation unit 103. For example, when the MAC control unit 102 generates a plurality of clusters, the MAC control unit 102 outputs the generated cluster TA values and the generated cluster IDs corresponding to the number of clusters.

Further, for example, when the radio resource control unit 101 is notified of the completion of calculation of the cluster TA value from the MAC control unit 102, the radio resource control unit 101 allocates the radio resource to the cluster TA value. The radio resource control unit 101, for example, allocates the allocated SI-RNTI in advance, on the radio resource of the PDCCH. Also, the radio resource control unit 101 allocates the cluster ID and the cluster TA value to be transmitted as the broadcast information, on the radio resource of the PDSCH. The resource allocation information of the broadcast information, for example, is included in the control information associated with the SI-RNTI (for example, FIG. 13B). The radio resource control unit 101 outputs the SI-RNTI and the control information associated with the SI-RNTI to the multiplexing unit 107. Accordingly, for example, the broadcast information is transmitted by broadcast, to the mobile station 200.

As is the same case with the second and third embodiments of the present invention, thereafter the processing can similarly be performed (S15). As is the same case with the second embodiment of the present invention, when there is no allocation of the cluster ID (S71, No), this is the case where the discrepancy in synchronization is continued in the mobile station 200. According to this case, the individual transmission timing control is performed by the C-RNTI. In this case, for example, the transmission timing of the mobile station 200 is controlled by the individual TA value transmitted by the PDCCH (S34).

FIG. 16 is a diagram illustrating an operational example of the mobile station 200. The mobile station 200 further performs the processing of determining whether or not there is the allocation of the cluster ID (S71). For example, the determination can be made based on whether or not the control information processing unit 207 receives (or inputs) the cluster ID transmitted as the MAC-CE control information.

When there is the allocation of the cluster ID (S71, Yes), the mobile station 200 receives the cluster TA value notified by the broadcast information (S72). For example, the control channel demodulation unit 206 receives the control signal transmitted by the PDCCH and extracts the SI-RNTI. When the extracted SI-RNTI corresponds to the allocated SI-RNTI for the mobile station itself in advance, the control channel demodulation unit 206 extracts the control information associated with the SI-RNTI. The control channel demodulation unit 206 reads out the resource allocation information of the broadcast information included in the control information associated with the SI-RNTI and outputs the resource allocation information to the demodulation unit 204 and the decoding unit 205. Accordingly, for example, the mobile station 200 can extract the broadcast information allocated on the radio resource of the PDSCH. Then, the control information processing unit 207, for example, reads out the cluster ID and the cluster TA value from the broadcast information, finds a cluster ID corresponding to the received cluster ID at S71, from the broadcast information, and extracts the cluster TA value corresponding to the cluster ID. The extracted cluster TA value, for example, is outputted to the transmission timing control unit 215, and the transmission timing control is performed.

Thereafter the processing can similarly be performed as described in the second and third embodiments (S33 to S35).

In the fourth embodiment of the present invention, the transmission timing control based on the same cluster TA value is performed with respect to the plurality of mobile stations 200 grouped by the cluster ID, so that the transmission timing control can collectively be performed with respect to the grouped plurality of mobile stations 200. Also, as is illustrated in FIG. 13, the base station 100 allocates the cluster TA values for the plurality of mobile stations 200, so that, for example, the SI-RNTI can be allocated by one radio resource block on the PDCCH which is shared by the plurality of mobile stations 200. Accordingly, in the fourth embodiment of the present invention, the overhead of the control signal can be reduced, compared with the example where the TA value is transmitted by using of the plurality of radio resource block on the PDCCH.

In the fourth embodiment of the present invention, the cluster TA value and the cluster ID transmitted as part of the broadcast information are transmitted by broadcast (S51). However, with regards to a unit of the grouped plurality of mobile stations 200 by the cluster ID, the cluster TA value and the cluster ID are addressed and transmitted to the plurality of mobile stations 200, so that multicasting transmission designed and transmitted addressed to the plurality of mobile stations 200 can be applied.

Fifth Embodiment

Next, the fifth embodiment of the present invention will be described. In the fourth embodiment of the present invention, the example is described where the cluster TA value is transmitted as the broadcast information. In the fifth embodiment of the present invention, an example will be described where the cluster TA value is transmitted as a paging channel. The paging channel is a channel used for transmission when an event occurs to the mobile station 200, for example, when a paging or incoming call addressed to the mobile station 200 occurs. Also, the paging channel, for example, is a channel to be notified by broadcast from the base station 100. The fifth embodiment of the present invention is the example where the cluster TA value is transmitted by using a part of the broadcast information transmitted by the paging channel. For example, the transmission of the broadcast information by the paging channel is performed more frequently than the transmission of SIB, so that the number of times that the transmission timing control is performed can be increased in the fifth embodiment of the present invention, compared with the fourth embodiment of the present invention.

Figure 18A:
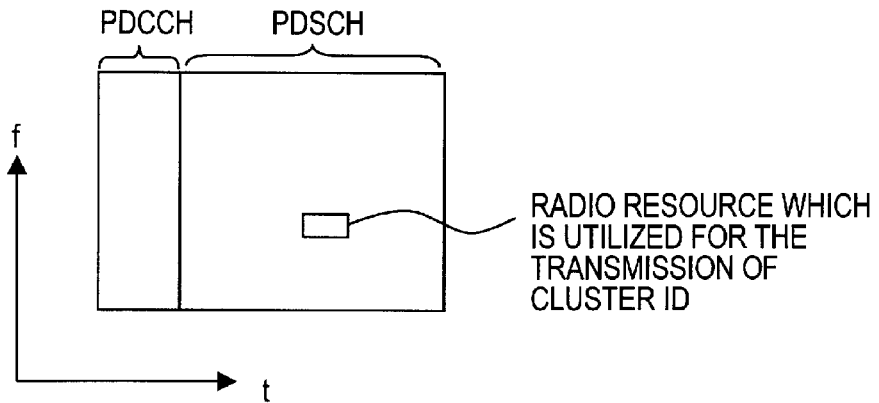
FIGS. 18A and 18B are diagrams illustrating the example of the radio resource allocation.
Figure 18B:
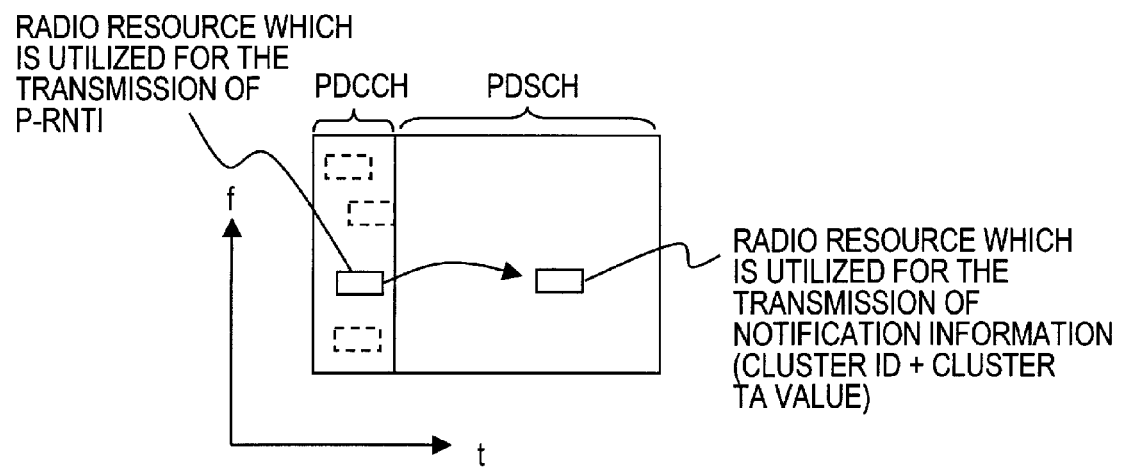

FIGS. 18A and 18B are diagrams illustrating an example of radio resource allocation to the broadcast information by the cluster ID and the paging channel respectively. As is illustrated in FIG. 18A, the allocated cluster ID is transmitted as the MAC-CE control information by using the radio resource of the PDSCH. Similarly, as is illustrated in FIG. 18B, P-RNTI (Paging-RNTI) is allocated on the radio resource of the PDCCH, and the broadcast information transmitted by the paging channel is allocated on the radio resource of the PDSCH respectively. The P-RNTI, for example, is an identifier of the broadcast information transmitted by the paging channel, is allocated for the mobile station 200 in advance, and held. Then, when the P-RNTI to be held corresponds to the received P-RNTI in the mobile station 200, the resource allocation information is extracted from the control information associated with P-RNTI. The mobile station 200 can receive the broadcast information by the paging channel allocated on the radio resource of the PDSCH, from the extracted resource allocation information. As is the same case with the fourth embodiment of the present invention, the broadcast information includes the cluster ID and the cluster TA value. The broadcast information includes the plural pairs corresponding to the number of clusters when the plurality of clusters is generated (for example, FIG. 17).

The example of the configurations of the radio communication system 10, the base station 100, and the mobile station 200 according to the fifth embodiment of the present invention is similar to those in the second to fourth embodiments of the present invention.

Figure 19:
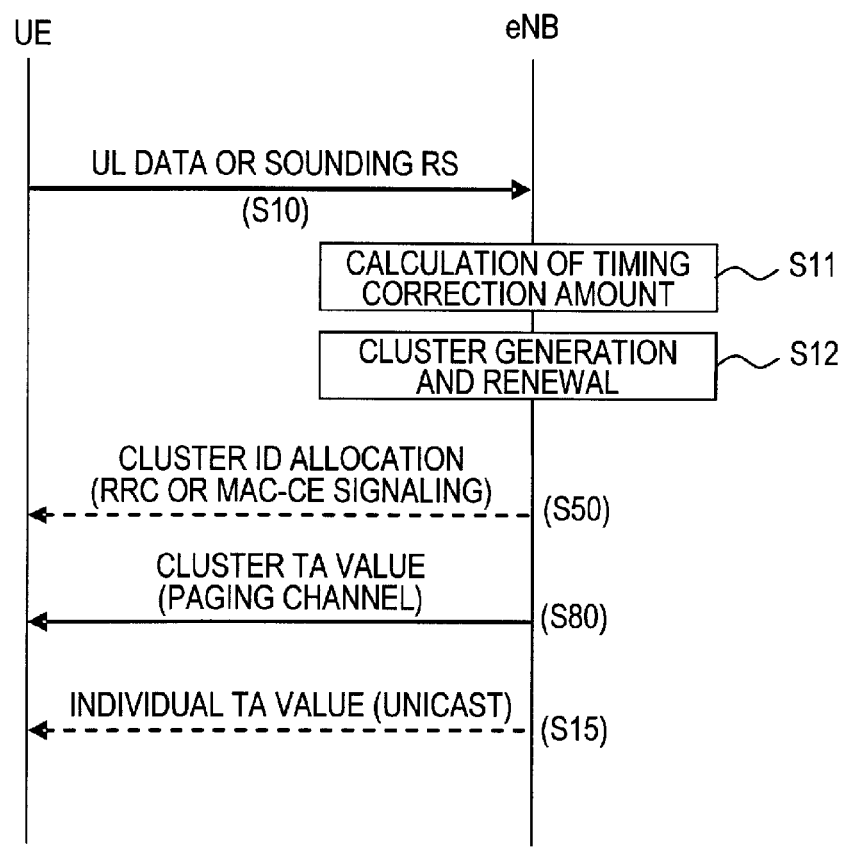
FIG. 19 is a sequence diagram illustrating the example of the entire operation.
Figure 20:
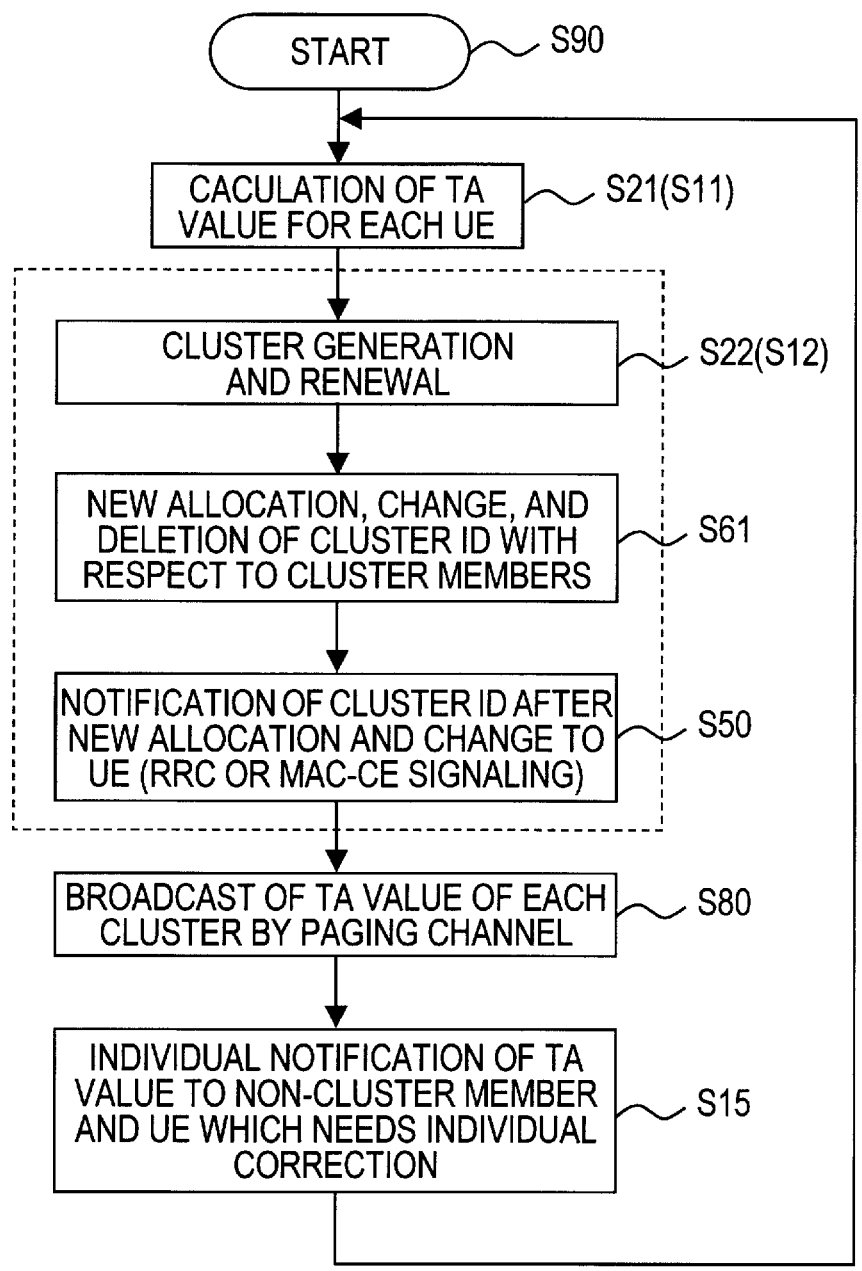
FIG. 20 is a flowchart illustrating the example of operations of the base station apparatus.

FIG. 19 is a diagram illustrating an entire operational example, and FIG. 20 is a diagram illustrating an operational example of the base station 100. In FIGS. 19 and 20, the base station 100 further transmits the cluster TA value and the allocated cluster ID, by broadcast as the broadcast information by the paging channel (S80).

In the present processing, for example, when the radio resource control unit 101 is notified of the generation of the cluster TA value from the MAC control unit 102, the radio resource control unit 101 extracts the transmitting destination for the cluster TA value from the transmitted P-RNTI already. Then, the radio resource control unit 101 allocates the P-RNTI on the radio resource of the PDCCH and allocates the cluster ID and the cluster TA value on the radio resource of the PDSCH respectively. Further, the radio resource control unit 101, for example, generates the control information associated with the P-RNTI and makes the control information to include the resource allocation information of the cluster TA value. The radio resource control unit 101 outputs the P-RNTI and the control information to the multiplexing unit 107 and outputs the cluster ID and the cluster TA value to the packet generation unit 103 respectively. Accordingly, for example, the radio resource allocation is performed as illustrated in FIG. 18B, and the cluster ID and the cluster TA value are transmitted to the mobile station 200. Thereafter the processing can similarly be carried out as described in the fourth embodiment.

Figure 21:
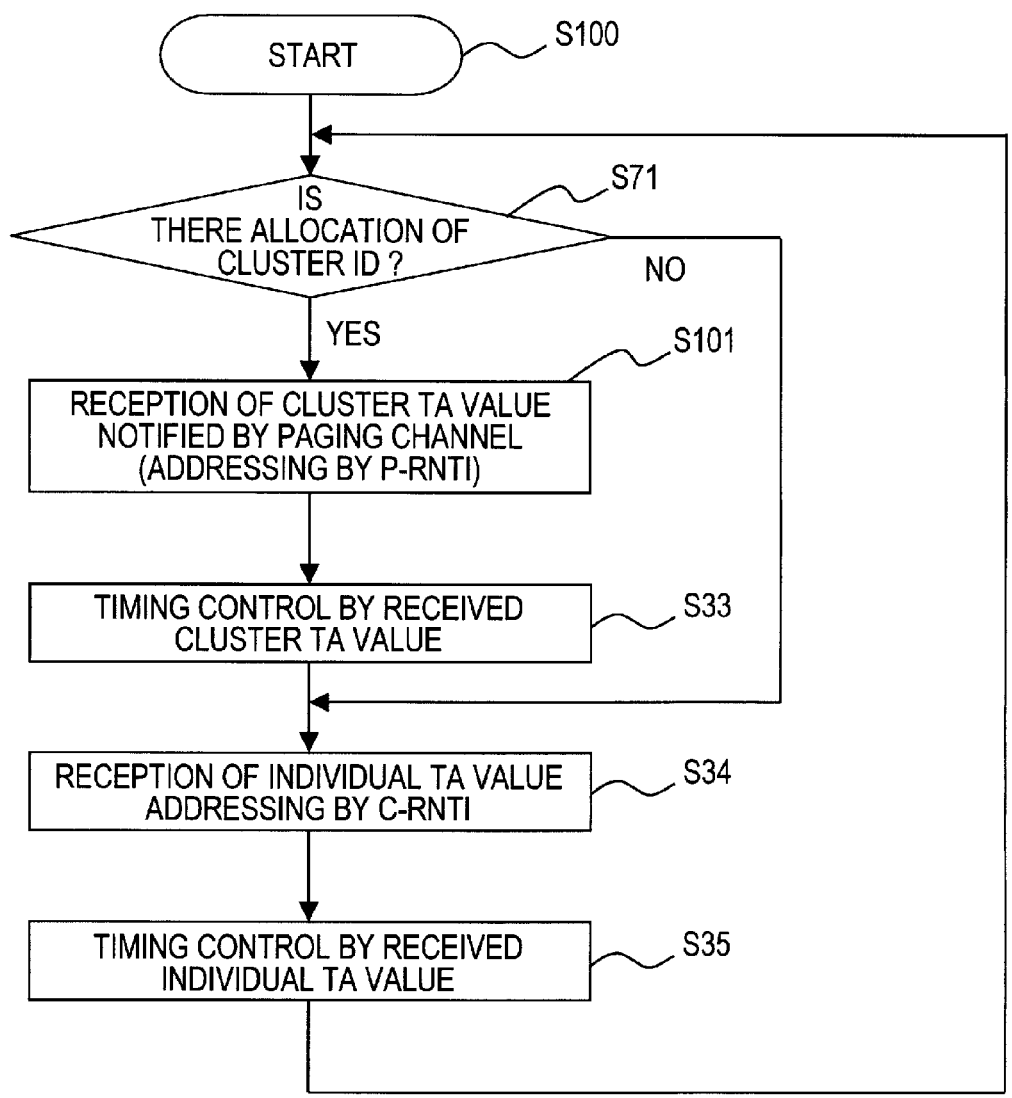
FIG. 21 is a flowchart illustrating the example of operations of the mobile station apparatus.

FIG. 21 is a diagram illustrating an operational example of the mobile station 200. In the example of operation of the mobile station 200, when the allocation of the cluster ID is performed (S71, Yes), the cluster ID and the cluster TA value notified by the paging channel are further received (S101). For example, when the control channel demodulation unit 206 receives the P-RNTI, and the P-RNTI corresponds to the held P-RNTI, it is recognized that the P-RNTI is addressed to the mobile station itself, and the control information involved in the P-RNTI is extracted. Then, the control channel demodulation unit 206 extracts the allocation information of the transmitted broadcast information by the paging channel from the control information, and outputs the allocation information to the demodulation unit 204 and the decoding unit 205. Accordingly, for example, the broadcast information transmitted by the paging channel is demodulated and decoded, and can be outputted to the control information processing unit 207 as the broadcast information. For example, the control information processing unit 207 extracts the cluster ID corresponding to the allocated cluster ID (S50) from the broadcast information and reads out the cluster TA value corresponding to the cluster ID from the broadcast information. Then, the cluster TA value is outputted to the transmission timing control unit 215, and the transmission timing control is performed.

In the fifth embodiment of the present invention, the transmission timing control to the grouped plurality of mobile stations 200 by the cluster ID is performed by the same cluster TA value, so that the transmission timing control can collectively be performed to the grouped plurality of mobile stations 200. Also, the base station 100 allocates the cluster TA value for the plurality of mobile stations 200, for example, as is illustrated in FIG. 18, the P-RNTI can be allocated by one radio resource block on the PDCCH, which is shared by the plurality of mobile stations 200. Accordingly, in the fourth embodiment of the present invention, the overhead of the control signal can be reduced, compared with the example where the TA value is transmitted by using of the plurality of radio resources block on the PDCCH.

Example of Other Embodiment

Figure 22:
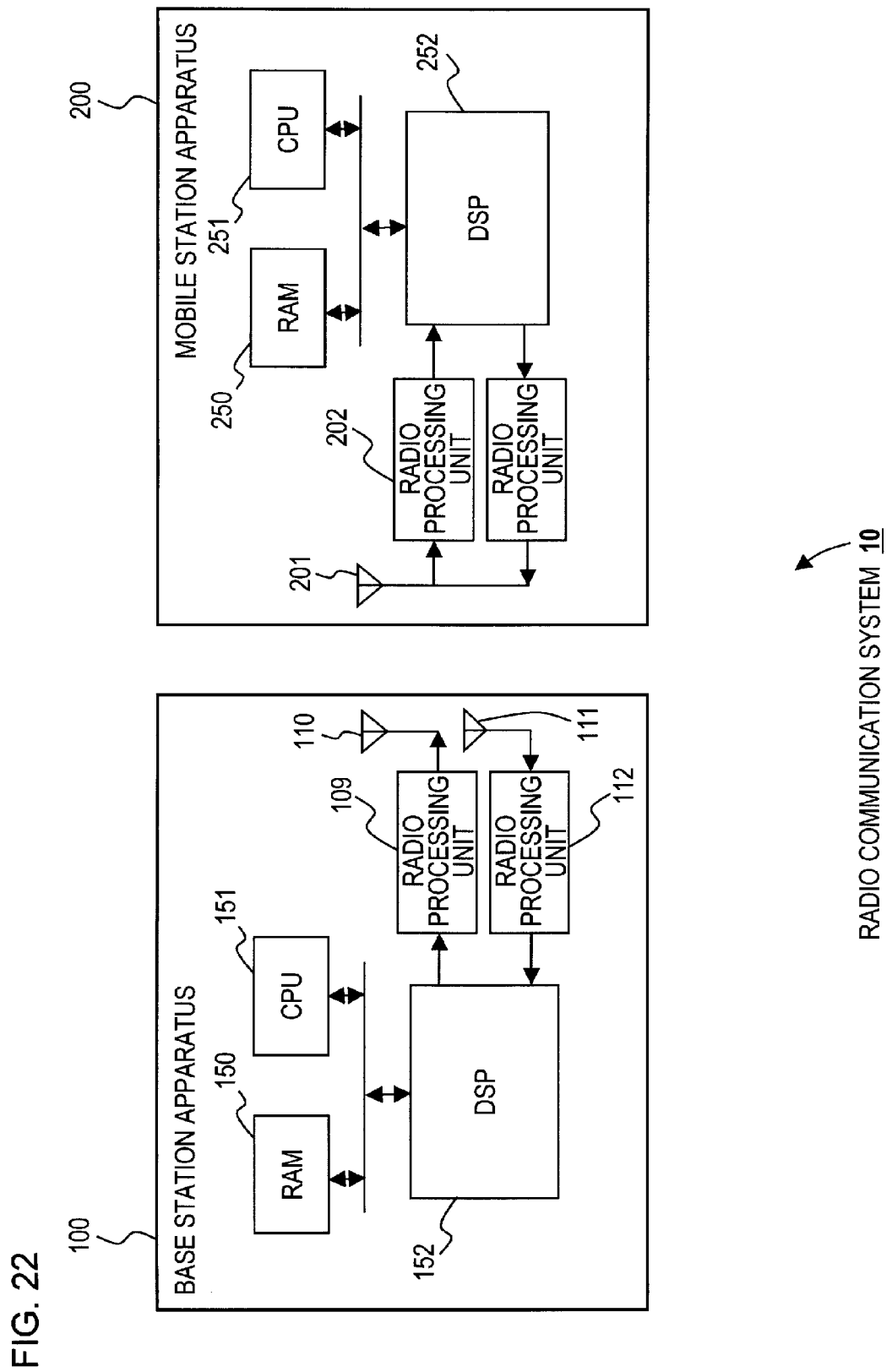
FIG. 22 is a diagram illustrating the examples of the configuration of the base station apparatus and the mobile station apparatus.
Figure 23:
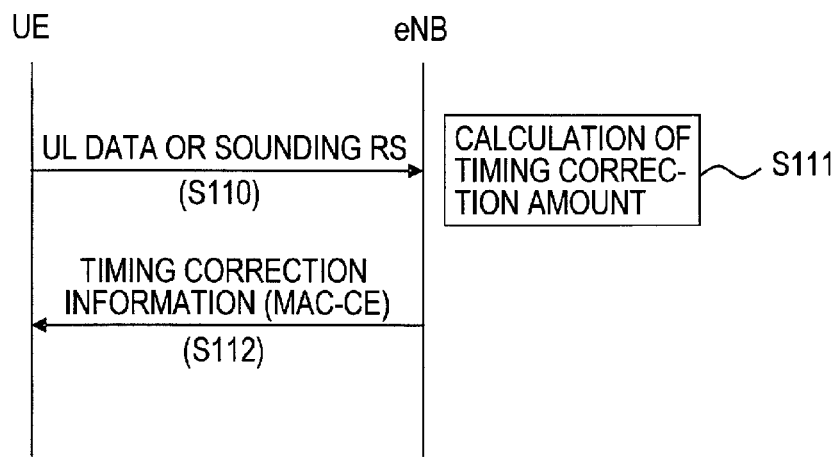
FIG. 23 is a sequence diagram illustrating the example of operations of the transmission timing control.

In the second to fifth embodiments of the present invention, the base station 100 and the mobile station 200, for example, is described as illustrated in FIGS. 3 and 4. For example, the second to fifth embodiments of the present invention can be carried out by the base station 100 and the mobile station 200 as illustrated in FIG. 22.

Further, the base station 100 includes a RAM (Random Access Memory), a CPU (Central Processing Unit) 151, and a DSP (Digital Signal Processor) 152. For example, respective functions from the radio resource control unit 101 to the IFFT unit 108, and from the FFT unit 113 to the cluster generation unit 118 in the base station 100 illustrated in FIG. 3 can be carried out by the cooperative operations of the CPU 151, the RAM 150, and the DSP 152.

Moreover, the mobile station 200 includes a RAM 250, a CPU 251, and a DSP 252. For example, respective functions from the FFT unit 203 to the control information processing unit 207 and from the data processing unit 208 to the transmission timing control unit 215 of the mobile station 200 illustrated in FIG. 4 can be carried out by the cooperative operations of the CPU 251, the RAM 250, and the DSP 252.

Also, in the aforementioned second embodiment of the present invention, the example is described where the embodiment can be carried out by the either the relative value or the absolute value of the cluster TA value. However, in the third to fifth embodiments of the present invention, the embodiments can similarly be carried out by the either the relative value or the absolute value of the cluster TA value. As is described in the second embodiment of the present invention, in the case of the relative value, in the mobile station 200, the cluster TA value to be previously generated is generated by the relative value to be previously received, and the absolute value of the cluster TA value can be obtained by adding or subtracting the cluster TA value to be previously generated and the received cluster TA value.

The base station apparatus, the mobile station apparatus, the radio communication method, and the radio communication system can be provided that reduce the overhead of the control signal. Also, the base station apparatus, the mobile station apparatus, the radio communication method, and the radio communication system can be provided that can prevent the discrepancy in reception timings in the base station apparatus.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

10: radio communication system
100: base station apparatus (base station)
101: radio resource control unit
102: MAC control unit
103: packet generation unit
107: multiplexing unit
117: TA value calculation unit for each US (TA value calculation unit)
118: cluster generation and renewal unit (cluster generation unit)
150: RAM
151: CPU
152: DSP
200: mobile station apparatuses (mobile station)
206: control channel demodulation unit
207: control information processing unit
215: transmission-timing control unit
250: RAM
251: CPU
252: DSP

What is claimed is:

1. A base station apparatus for performing radio communication with a mobile station apparatus, the base station apparatus comprising:
   a group generation unit which groups a plurality of mobile station apparatuses whose timing differences between a reception frame and transmission frame calculated on the basis of a signal received from the mobile station apparatus fall within a constant range; and
   a transmission unit which transmits a control amount of timing difference to the grouped plurality of mobile station apparatuses.

2. The base station apparatus according to claim 1, wherein the group generation unit allocates a same identifier for the grouped plurality of mobile station apparatuses.

3. The base station apparatus according to claim 2, wherein the transmission unit transmits a timing difference control signal and the identifier to the grouped plurality of mobile station apparatuses.

4. The base station apparatus according to claim 2, wherein the transmission unit transmits a timing difference control signal and the identifier to the grouped plurality of mobile station apparatuses by using a paging channel.

5. The base station apparatus according to claim 2, wherein the transmission unit transmits a timing difference control signal and the identifier as broadcast information to the grouped plurality of mobile station apparatuses.

6. The base station apparatus according to claim 1, wherein the transmission unit transmits the identifier to each of the grouped plurality of mobile station apparatuses, and transmits the control amount of timing difference and the identifier to the grouped plurality of mobile station apparatuses.

7. The base station apparatus according to claim 6, wherein the transmitting unit transmits the identifier by using a first transmission channel by which a data signal is transmitted, when the transmitting unit transmits the identifier to each of the grouped plurality of mobile station apparatuses, and the transmitting unit transmits the control amount of timing difference by the first transmission channel and transmits the control amount of timing difference by a second transmission channel by which a control signal is transmitted, when the transmitting unit transmits the control amount of timing difference and the identifier to the grouped plurality of mobile station apparatuses.

8. The base station apparatus according to claim 1, wherein the group generation unit groups the plurality of mobile station apparatuses in which an amount of reception timing error falls within a constant range.

9. The base station apparatus according to claim 1, wherein the group generation unit groups the plurality of mobile station apparatuses in which an amount of reception timing error falls within a constant range and allocates a same identifier for the grouped plurality of mobile station apparatuses.

10. The base station apparatus according to claim 1, wherein the group generation unit groups the plurality of mobile station apparatuses in which a fluctuation amount of reception timing error falls within a constant range.

11. The base station apparatus according to claim 1, wherein the group generation unit groups the plurality of mobile station apparatuses in which a fluctuation amount of reception timing error falls within a constant range and allocates a same identifier for the grouped plurality of mobile station apparatuses.

12. The base station apparatus according to claim 1, wherein the control amount of timing difference is a relative value which is a differential value between a first and second control amounts of timing difference, or an absolute value of the first or second control amounts of timing difference.

13. The base station apparatus according to claim 1, wherein the control amount of timing difference includes a transmission timing in a case where the mobile station apparatus transmits a radio signal to the base station apparatus.

14. The base station apparatus according to claim 1, wherein the transmitting unit transmits the control amount of timing difference to the mobile station apparatus in which an amount of reception timing error is higher than an individual error threshold value, of the grouped plurality of mobile station apparatuses.

15. The base station apparatus according to claim 1, wherein the group generation unit groups delete from the group and groups an another group to the mobile station apparatus in which a state is continued where an amount of reception timing error is higher than an individual error threshold value, or deletes from the group and controls the transmission unit to transmit the control amount of timing difference of the mobile station apparatus deleted from the group.

16. A mobile station apparatus for performing radio communication with a base station apparatus, the mobile station apparatus comprising:
    a reception unit which receives a control amount of timing difference transmitted to a grouped plurality of mobile station apparatuses, the plurality of mobile station apparatuses whose timing differences between a reception frame and transmission frame calculated on the basis of a signal received from the mobile station apparatus fall within a constant range and which is grouped; and
    a transmission timing control unit which controls a transmission timing of a radio signal transmitting to the base station apparatus in accordance with the received control amount of timing difference.

17. A radio communication method in a base station apparatus for performing radio communication with mobile station apparatus, the method comprising:
    grouping a plurality of mobile station apparatuses whose timing differences between a reception frame and transmission frame calculated on the basis of a signal received from the mobile station apparatus fall within a constant range; and
    transmitting the control amount of timing difference to the grouped plurality of mobile station apparatuses.

18. A radio communication method in a mobile station apparatus for performing radio communication with a base station apparatus, the method comprising:
    receiving a control amount of timing difference transmitted to a grouped plurality of mobile station apparatuses, the plurality of mobile station apparatuses whose timing differences between a reception frame and transmission frame calculated on the basis of a signal received from the mobile station apparatus fall within a constant range and which is grouped; and
    controlling a transmission timing of a radio signal transmitting to the base station apparatus in accordance with the received control amount of timing difference.

19. A radio communication system comprising;
    a mobile station apparatus; and
    a base station apparatus, wherein
        radio communication is performed between the mobile station apparatus and the base station apparatus,
    the base station apparatus includes:
        a group generation unit which groups a plurality of mobile station apparatus whose timing differences between a reception frame and transmission frame calculated on the basis of a signal received from the mobile station apparatus fall within a constant range; and
        a transmitting unit which transmits the control amount of timing difference to the grouped plurality of mobile station apparatus, and
    the mobile station apparatus includes:
        a reception unit which receives the control amount of timing difference; and
        a transmission timing control unit which controls a transmission timing of a radio signal transmitting to the base station apparatus in accordance with the received control amount of timing difference.

* * * * *